US012720494B2

(12) United States Patent
Li

(10) Patent No.: US 12,720,494 B2
(45) Date of Patent: Aug. 25, 2026

(54) METHOD AND APPARATUS FOR REPORTING TERMINAL CAPABILITY INFORMATION, AND COMMUNICATION DEVICE AND STORAGE MEDIUM

(71) Applicant: Beijing Xiaomi Mobile Software Co., Ltd., Beijing (CN)

(72) Inventor: Yanhua Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 289 days.

(21) Appl. No.: 18/561,345

(22) PCT Filed: May 28, 2021

(86) PCT No.: PCT/CN2021/096966

§ 371 (c)(1),
(2) Date: Nov. 16, 2023

(87) PCT Pub. No.: WO2022/246845

PCT Pub. Date: Dec. 1, 2022

(65) Prior Publication Data

US 2024/0251384 A1 Jul. 25, 2024

(51) Int. Cl.
*H04W 68/02* (2009.01)
*H04W 8/24* (2009.01)
*H04W 76/27* (2018.01)

(52) U.S. Cl.
CPC ............ *H04W 68/02* (2013.01); *H04W 8/24* (2013.01); *H04W 76/27* (2018.02)

(58) Field of Classification Search
CPC ......... H04W 8/24; H04W 4/08; H04W 68/02; H04W 68/025; H04W 68/005; H04W 8/186
See application file for complete search history.

(56) References Cited

U.S. PATENT DOCUMENTS

2014/0181200 A1* 6/2014 Huang .................... H04W 4/70 709/204
2017/0171694 A1* 6/2017 Liu ....................... H04W 68/00
2017/0181123 A1* 6/2017 Schliwa-Bertling ......................... H04W 72/51
2020/0275375 A1* 8/2020 Liu .................. H04W 52/0216
2023/0362888 A1* 11/2023 Zhou ..................... H04W 68/02

FOREIGN PATENT DOCUMENTS

WO 2022028807 A1 2/2022

OTHER PUBLICATIONS

Intel Corporation, "Network assigned subgrouping", 3GPP TSG RAN WG2 Meeting #113-e, R2-2101301, E-Meeting, Jan. 25-Feb. 5, 2021, 3 pages.

(Continued)

*Primary Examiner* — Mirza F Alam
(74) *Attorney, Agent, or Firm* — Finnegan, Henderson, Farabow, Garrett & Dunner, L.L.P.

(57) ABSTRACT

A method for reporting terminal capability information is performed by a terminal, and includes: sending, to a first base station, first terminal capability information for group paging; wherein the first terminal capability information indicates whether or not the terminal supports paging the terminal by the group paging.

20 Claims, 12 Drawing Sheets

(56) References Cited

OTHER PUBLICATIONS

Extended European Search Report issued in Application No. 21942416.5 dated Jun. 5, 2024, 8 pages.
Notice of Reasons for Refusal issued by the Japanese Patent Office on Dec. 13, 2024, in corresponding Application No. JP 2023-572873, 10 pages.
"Report of [AT114-e][025][ePowSav] Subgrouping network architecture", MediaTek Inc., 3GPP TSG RAN WG2 Meeting #114 electronic, R2-2106666, Online, May 19-27, 2021, 25 pages.

* cited by examiner terminal first base station step 21, reporting first terminal capability information for group paging; wherein the first terminal capability information is at least configured to indicate that the terminal supports or does not support paging the terminal in a group paging manner

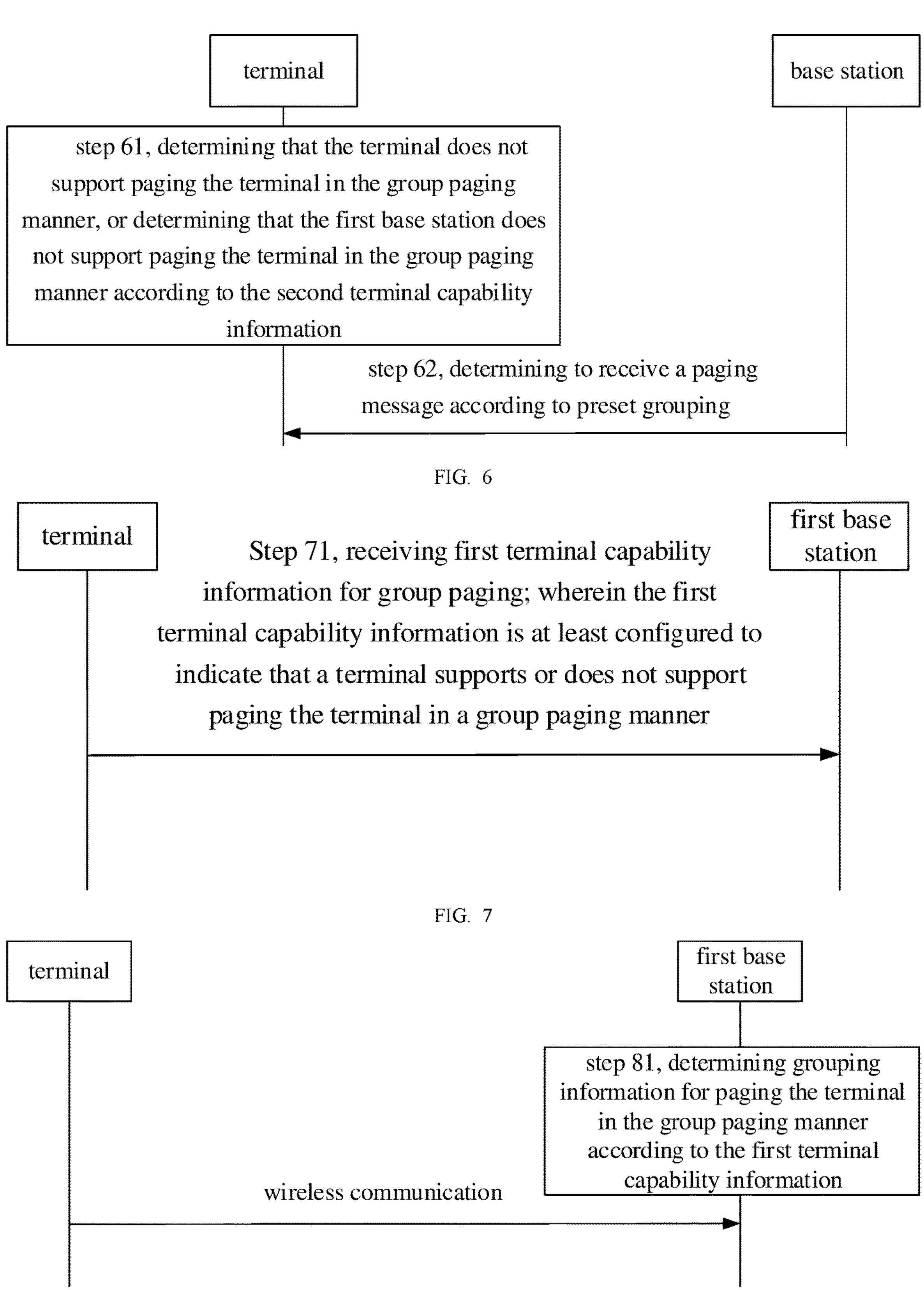
terminal
base station
step 61, determining that the terminal does not support paging the terminal in the group paging manner, or determining that the first base station does not support paging the terminal in the group paging manner according to the second terminal capability information
step 62, determining to receive a paging message according to preset grouping
FIG. 6
terminal
first base station
Step 71, receiving first terminal capability information for group paging; wherein the first terminal capability information is at least configured to indicate that a terminal supports or does not support paging the terminal in a group paging manner
FIG. 7
terminal
first base station
step 81, determining grouping information for paging the terminal in the group paging manner according to the first terminal capability information
wireless communication
FIG. 8

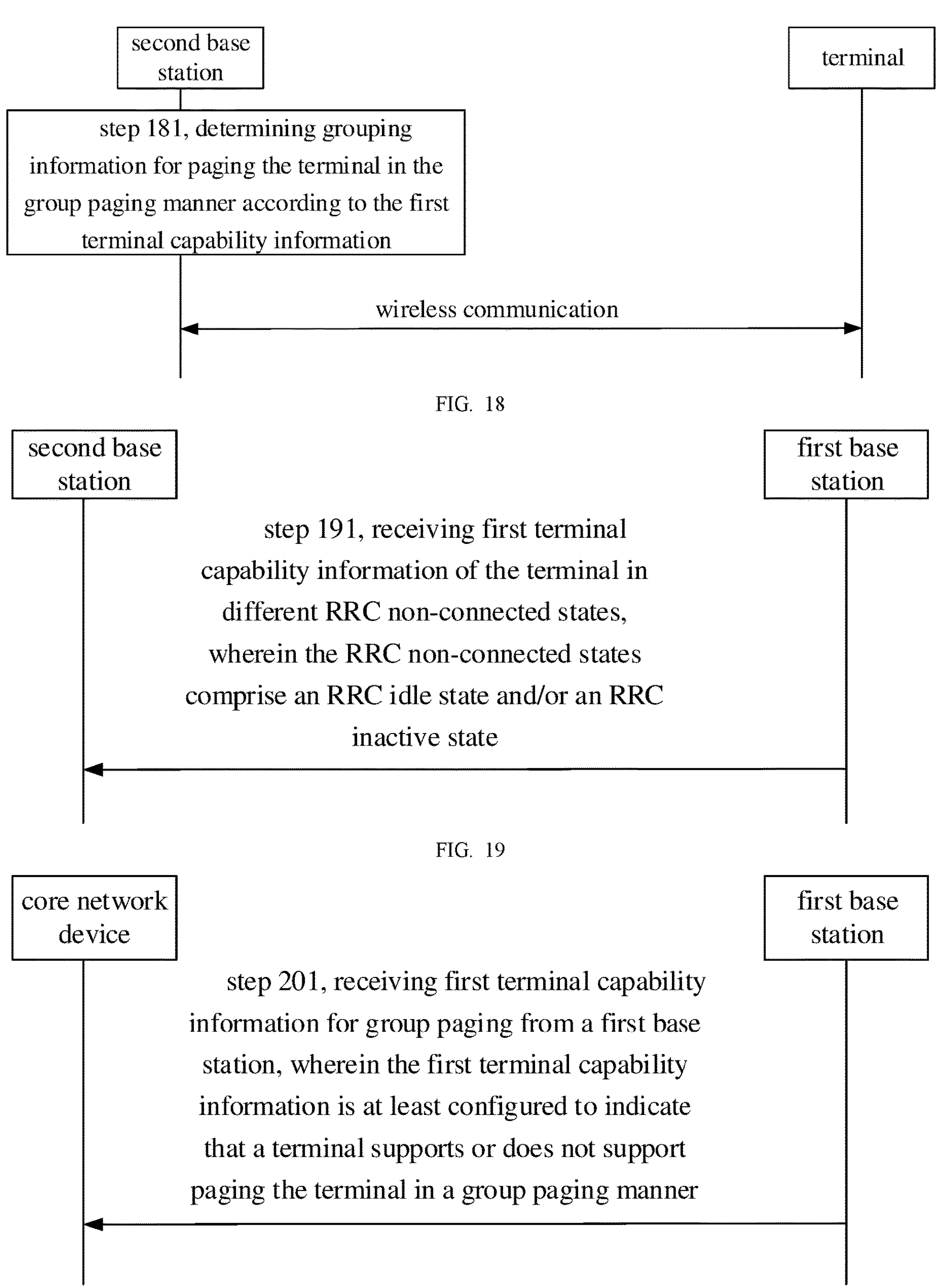
second base station
terminal
step 181, determining grouping information for paging the terminal in the group paging manner according to the first terminal capability information
wireless communication
FIG. 18
second base station
first base station
step 191, receiving first terminal capability information of the terminal in different RRC non-connected states, wherein the RRC non-connected states comprise an RRC idle state and/or an RRC inactive state
FIG. 19
core network device
first base station
step 201, receiving first terminal capability information for group paging from a first base station, wherein the first terminal capability information is at least configured to indicate that a terminal supports or does not support paging the terminal in a group paging manner
FIG. 20

METHOD AND APPARATUS FOR REPORTING TERMINAL CAPABILITY INFORMATION, AND COMMUNICATION DEVICE AND STORAGE MEDIUM

CROSS-REFERENCE TO RELATED APPLICATION

This application national phase of International Application No. PCT/CN2021/096966, filed on May 28, 2021, the entire content of which is incorporated herein by reference.

TECHNICAL FIELD

The disclosure relates to, but is not limited to, the field of wireless communication technologies, and particularly to, a method and an apparatus for reporting terminal capability information, a communication device, and a storage medium.

BACKGROUND

Paging is an important function to achieve wireless communication. A role of paging is to notify, by a base station, a paged terminal to respond to a network according to requirements of the network. The base station and the terminal may agree on a paging occasion (PO). The base station may send a paging message at the PO. The terminal may receive the paging message at the corresponding PO.

SUMMARY

According to a first aspect of the disclosure, a method for reporting terminal capability information is provided. The method is performed by a terminal. The method includes:

sending, to a first base station, first terminal capability information for group paging: in which the first terminal capability information indicates whether or not the terminal supports paging the terminal by the group paging.

According to a second aspect of the disclosure, a method for reporting terminal capability information is provided. The method is performed by a first base station. The method includes:

receiving, from a terminal, first terminal capability information for group paging: in which the first terminal capability information indicates whether or not the terminal supports paging the terminal by the group paging.

According to a third aspect of embodiments of the disclosure, a terminal is provided and includes: a processor: and a memory for storing instructions executable by the processor: in which the processor is configured to perform the method as described in the first aspect when running the executable instructions.

BRIEF DESCRIPTION OF THE DRAWINGS

FIG. 6 is a flowchart illustrating a method for reporting terminal capability information according to some embodiments.

FIG. 7 is a flowchart illustrating a method for reporting terminal capability information according to some embodiments.

FIG. 8 is a flowchart illustrating a method for reporting terminal capability information according to some embodiments.

FIG. 15 is a flowchart illustrating a method for reporting terminal capability information according to some embodiments.

FIG. 16 is a flowchart illustrating a method for reporting terminal capability information according to some embodiments.

FIG. 17 is a flowchart illustrating a method for reporting terminal capability information according to some embodiments.

FIG. 18 is a flowchart illustrating a method for reporting terminal capability information according to some embodiments.

FIG. 19 is a flowchart illustrating a method for reporting terminal capability information according to some embodiments.

FIG. 20 is a flowchart illustrating a method for reporting terminal capability information according to some embodiments.

DETAILED DESCRIPTION

Reference will be made in detail to some embodiments, examples of which are illustrated in the accompanying drawings. The following description refers to the accompanying drawings in which the same numbers in different drawings represent the same or similar elements unless otherwise represented. The implementations set forth in the following description of some embodiments do not represent all implementations consistent with embodiments of the disclosure. Instead, they are merely examples of apparatuses and methods consistent with aspects related to embodiments of the disclosure as recited in the appended claims.

The terms used in embodiments of the disclosure are only for the purpose of describing specific embodiments and are not intended to limit embodiments of the disclosure. The singular forms of "a" and "the" used in embodiments of the disclosure and appended claims are also intended to include plural forms, unless the context clearly indicates other meanings. It should also be understood that the term "and/or" as used herein refers to and includes any or all possible combinations of one or more associated listed items.

It should be understood that although the terms first, second, and third may be used in embodiments of the disclosure to describe various information, the information should not be limited to these terms. These terms are only used to distinguish the same type of information from each other. For example, without departing from the scope of embodiments of the disclosure, the first information may also be referred to as the second information, and similarly, the second information may also be referred to as the first information. Depending on the context, the word "if" as used herein can be interpreted as "when", "while" or "in response to determining".

The term used herein is "greater than" or "less than" when representing a size relationship for purposes of conciseness and ease of understanding. However, it should be understood for those skilled in the art that the term "greater than" covers the meaning of "greater than or equal to" and "less than" covers the meaning of "less than or equal to".

Figures 1, 2:
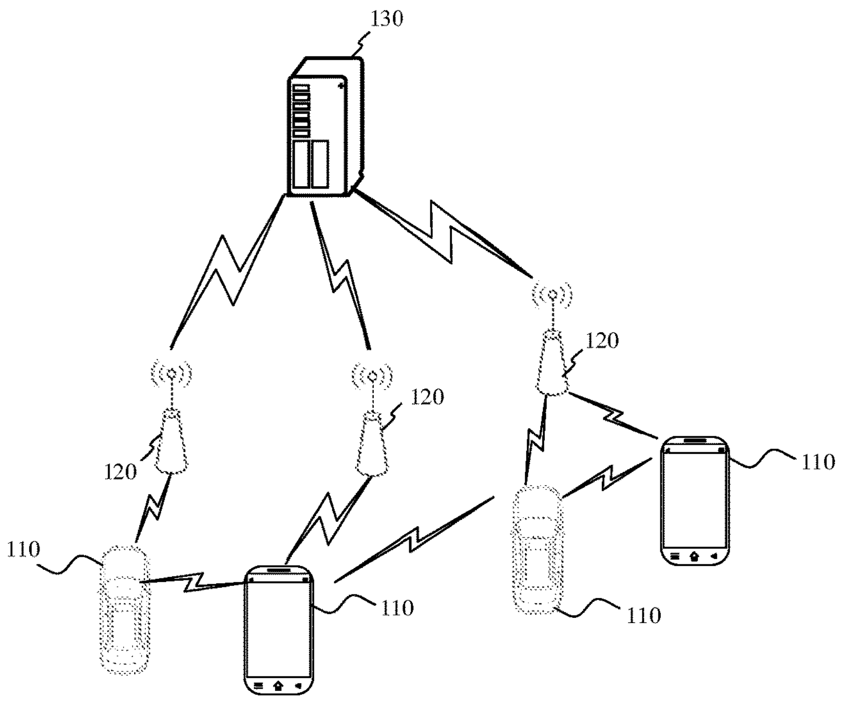
FIG. 1 is a diagram illustrating a wireless communication system according to some embodiments.
FIG. 2 is a flowchart illustrating a method for reporting terminal capability information according to some embodiments.

FIG. 1 is a diagram illustrating a wireless communication system in embodiments of the disclosure. As illustrated in FIG. 1, the wireless communication system is a communication system based on mobile communication technologies. The wireless communication system may include several user equipments (UEs) 110 and several base stations 120.

The UE 110 may be a device that provides speech and/or data connectivity for a user. The UE 110 may communicate with one or more core networks via a radio access network (RAN). The UE 110 may be an Internet of Things terminal, such as a sensor device, a mobile phone, and a computer having an Internet of Things terminal, for example, a fixed, portable, pocket-sized, handheld, computer built-in, or vehicle-mounted device. For example, it may be a station (STA), a subscriber unit, a subscriber station, a mobile station, a mobile, a remote station, an access point, a remote terminal, an access terminal, a user terminal, a user agent, a user device, or a user equipment (UE). Alternatively, the UE 110 may also be a device of an unmanned aerial vehicle. Alternatively, the UE 110 also may be a vehicle-mounted device, for example, a trip computer having a wireless communication function or a wireless communication device connected to the trip computer. Alternatively, the UE 110 may also be a roadside device, for example, a street lamp, a signal lamp or other roadside device having the wireless communication function.

The base station 120 may be a network side device in the wireless communication system. The wireless communication system may be the 4th generation mobile communication (4G) system, also known as the long term evolution (LTE) system. The wireless communication system may also be the 5th generation mobile communication (5G) system, also known as the new radio (NR) system or 5G NR system. Alternatively, the wireless communication system may also be a next-generation system of the 5G system. The access network in the 5G system may be called the new generation-radio access network (NG-RAN).

The base station 120 may be an evolved node base station (eNB) used in the 4G system. Alternatively, the base station 120 may also be a next generation node base station (gNB) adopting a centralized and distributed architecture in the 5G system. When the base station 120 adopts the centralized and distributed architecture, it usually includes a central unit (CU) and at least two distributed units (DUs). The central unit is provided with a protocol stack of a Packet Data Convergence Protocol (PDCP) layer, a Radio Link Control (RLC) layer, and a Media Access Control (MAC) layer. The distributed unit is provided with a protocol stack of a Physical (PHY) layer. Embodiments of the disclosure may not limit the implementation manner of the base station 120.

A wireless connection may be established between the base station 120 and the UE 110 through a wireless air interface. In different embodiments, the wireless air interface may be a wireless air interface based on the 4G standard: or the wireless air interface may be a wireless air interface based on the 5G standard, such as the wireless air interface is a new air interface: or the wireless air interface may be a wireless air interface based on the next generation mobile communication network technology standard following the 5G standard.

In some embodiments, an end to end (E2E) link may also be established between the UEs 110, for example, a vehicle to vehicle (V2V) communication, a vehicle to infrastructure (V2I) communication and a vehicle to pedestrian (V2P) communication in a vehicle to everything (V2X) communication.

The above UEs may be referred to as terminal devices in the following embodiments.

In some embodiments, the wireless communication system may further include a network management device 130.

Several base stations 120 are connected to the network management device 130 respectively. The network management device 130 may be a core network device in the wireless communication system. For example, the network management device 130 may be a Mobility Management Entity (MME) in an Evolved Packet Core (EPC). Alternatively, the network management device may be other core network devices, such as a Serving Gateway (SGW), a Public Data Network Gateway (PGW), a Policy and Charging Rules Function, or a Home Subscriber Server (HSS), etc.

The implementation form of the network management device 130 is not limited in the embodiments of the disclosure.

In order to facilitate the understanding of those skilled in the art, embodiments of the disclosure list implementation manners to clearly illustrate technical solutions of the embodiments of the disclosure. Those skilled in the art may understand that, embodiments provided in the disclosure may be executed independently, or may be executed in combination with methods in other embodiments of the disclosure, or may be executed independently or by combination and then be executed with some methods in the other related art, which are not be limited in the embodiments of the disclosure.

In order to understand the technical solution as described in any embodiment of the disclosure better, a scenario of paging the terminal by group in the related art is illustrated.

In some embodiments, a paging probability Pnas is predetermined between the terminal and the core network. The base station broadcasts information including a relationship between the probability and a paging group, so that the terminal may determine the paging group where the terminal is located according to the received information.

In some embodiments, the core network may notify the base station of the paging probability of the terminal in response to sending a paging message to the base station, to facilitate the base station to determine the paging group of the terminal. In some embodiments, if the core network does not notify the base station of the paging probability of the terminal, the terminal may select a predetermined paging group.

In some embodiments, the terminal may report assistance information via a terminal (or UE) assistance information (UAI) message. The assistance information may indicate the network that the terminal expects to switch from a radio resource control (RRC) connected state to an RRC idle state or an RRC inactive state.

In some embodiments, when the assistance information is reported to the network, the network is in the RRC connected state: and the network may release the terminal to the RRC idle state or the RRC inactive state when receiving the assistance information. For the terminal in the RRC idle state or the RRC inactive state, the network may allocate different paging group identifiers. Different paging group identifiers correspond to different paging groups.

In the related art, terminals may be paged by a group paging manner. The network may page all terminals in a group by sending one paging message, without sending the paging message separately for each terminal. After receiving a group paging message, the terminal determines whether it belongs to a paged group, and if yes, the group paging message is responded, and if not, the group paging message is ignored. In this case, it is a problem to be considered how to implement the above mechanism.

As illustrated in FIG. 2, a method for reporting terminal capability information is provided in some embodiments. The method is performed by the terminal. The method includes the following step.

At step 21, first terminal capability information for group paging is reported.

The first terminal capability information is at least configured to indicate that the terminal supports or does not support paging the terminal in a group paging manner.

The terminal may be but not limited to a mobile phone, a wearable device, a vehicle-mounted terminal, a road side unit (RSU), a smart home terminal, an industrial sensing device and/or a medical device.

It should be noted that, the base station involved in the disclosure may be an access device where the terminal accesses the network. There may be various types of base stations such as a third generation (3G) network base station, a 4G network base station, a 5G network base station, or other evolutionary base station.

In some embodiments, the group paging may be that the network pages all terminals in one group by sending one group paging message, without sending the paging message separately for each terminal. After receiving the group paging message, the terminal determines whether it belongs to a paged group, and if yes, the group paging message is responded, and if not, the group paging message is ignored.

In some embodiments, there may be a plurality of groups for the group paging. Different groups may be configured with different paging resources. The terminal may belong to a certain group in the plurality of groups. Which group the terminal belongs to may be determined by the base station or a certain network element in the core network.

In some embodiments, which group the terminal belongs to may be determined by the base station or the network element in the core network. The first terminal capability information indicates a capability that the terminal supports paging the terminal in the group paging manner. In some embodiments, only when the terminal has the capability that supports paging the terminal in the group paging manner, the network side may page the terminal in the group paging manner. When the terminal does not have the capability that supports paging the terminal in the group paging manner, the network side may not page the terminal in the group paging manner. When the network side may not page the terminal in the group paging manner, the network side may not allocate grouping information to the terminal. The grouping information is configured to indicate the group to which the terminal belongs.

In some embodiments, the network side may determine the group to which the terminal belongs according to a probability of the terminal being paged. The network side may refer to the base station or the core network device. In some embodiments, in response to the probability of the terminal being paged being less than a probability threshold, it is determined that the terminal belongs to a first group: or in response to the probability of the terminal being paged being greater than the probability threshold, it is determined that the terminal belongs to a second group. Paging resources configured for the first group and the second group are different. It should be noted that, the first terminal capability information may indicate a capability that the terminal supports grouping according to the statistical probability value of the terminal being paged.

In some embodiments, the network side may determine the group to which the terminal belongs according to a probability level of the probability of the terminal being paged. In some embodiments, the probability level of the probability of the terminal being paged may be divided into a low level, a medium level, and a high level. In some embodiments, in response to the probability level of the probability of the terminal being paged being the low level, it is determined that the group to which the terminal belongs is a first group: or in response to the probability level of the probability of the terminal being paged is the medium level, it is determined that the group to which the terminal belongs is a second group: or in response to the probability level of the probability of the terminal being paged is the high level, it is determined that the group to which the terminal belongs is a third group. Paging resources configured for the first group, the second group, and the third group are different. It should be noted that, the first terminal capability information may indicate a capability that the terminal supports grouping according to the probability level of the statistical probability value of the terminal being paged. Different probability levels correspond to different probability ranges. For example, the low level corresponds to probabilities a to b, the medium level corresponds to probabilities c to d, and the high level corresponds to probabilities e to f. a is less than b, b is less than c, c is less than d, d is less than e, and e is less than f.

In some embodiments, the network side may allocate the probability or the probability level of the probability of the terminal being paged, and the base station may map the probability or the probability level to the group to which the terminal belongs.

It should be noted that, the group may be a group to which the terminal belongs, which is configured according to a preset rule when the terminal is paged in the group paging manner. There may be a plurality of groups.

In some embodiments, the first terminal capability information for the group paging is reported in response to the terminal establishing an RRC connection with the first base station. The first terminal capability information may indicate that the terminal supports paging the terminal in the group paging manner. Alternatively, the first terminal capability information may indicate that the terminal does not support paging the terminal in the group paging manner.

In some embodiments, the first terminal capability information of the terminal in different RRC non-connected states may be different. The RRC non-connected states include an RRC idle state and/or an RRC inactive state. In some embodiments, the first terminal capability information may indicate that when the terminal is in an RRC idle state, the terminal supports paging the terminal in the group paging manner. Alternatively, the first terminal capability information may indicate that when the terminal is in an RRC idle state, the terminal does not support paging the terminal in the group paging manner. The first terminal capability information may indicate that when the terminal is in an RRC inactive state, the terminal supports paging the terminal in the group paging manner. Alternatively, the first terminal capability information may indicate that when the terminal is in an RRC inactive state, the terminal does not support paging the terminal in the group paging manner.

In some embodiments, the first terminal capability information of the terminal in the RRC idle state is the same as the first terminal capability information of the terminal in the RRC inactive state.

In some embodiments, a terminal capability report message for indicating the first terminal capability information may be reported. In other embodiments, a terminal assistance information message for indicating the first terminal capability information may be reported.

It should be noted that, when the terminal assistance information message for indicating the first terminal capability information is reported, in response to a desired state indicated by the terminal assistance information message being an RRC idle state, the first terminal capability information is terminal capability information of the terminal in the RRC idle state. Alternatively, in response to a desired state indicated by the terminal assistance information message being an RRC inactive state, the first terminal capability information is terminal capability information of the terminal in the RRC inactive state. Alternatively, in response to a desired state indicated by the terminal assistance information message being an RRC non-connected state, the first terminal capability information is terminal capability information of the terminal in the RRC inactive state. The RRC non-connected state includes an RRC idle state and an RRC inactive state.

In some embodiments, the terminal in the RRC connected state may receive second terminal capability information for the group paging from the first base station. The second terminal capability information is at least configured to indicate that the first base station supports or does not support paging the terminal in the group paging manner. In some embodiments, when the terminal determines that the terminal does not support paging the terminal in the group paging manner after receiving the second terminal capability information, the terminal may receive a paging message according to a preset group. In other embodiments, it is determined that the first base station does not support paging the terminal in the group paging manner according to the second terminal capability information, and the terminal may receive a paging message according to a preset group. The preset group may be preconfigured. The first base station may send the paging message to the terminal by using resources in the group. In some embodiments, the paging message sent according to the preset group may be carried by a power-saving signal. In some embodiments, the paging message may be carried by other power-saving signal than the power-saving signal corresponding to the paging group. For example, the paging message may be carried by a common power-saving signal.

In some embodiments, when it is determined that the terminal does not support paging the terminal in the group paging manner, the terminal may receive the paging message according to a no-grouping solution. In other embodiments, when it is determined that the first base station does not support paging the terminal in the group paging manner according to the second terminal capability information, the terminal may receive the paging message according to the no-grouping solution. In some embodiments, if a paging advance indication is used, the paging advance indication may be carried by a common power-saving signal. In this case, the common power-saving signal does not carry grouping information.

In embodiments of the disclosure, the first terminal capability information for the group paging is reported. The first terminal capability information is at least configured to indicate that the terminal supports or does not support paging the terminal in the group paging manner. In this way, the network may determine that the terminal supports or does not support paging the terminal in the group paging manner according to the first terminal capability information when receiving the first terminal capability information, and may page the terminal in the group paging only manner in response to determining that the terminal supports paging the terminal in the group paging manner, and may not page the terminal in the group paging manner in response to determining that the terminal does not support paging the terminal in the group paging manner. Compared with that the network may not acquire the first terminal capability information of the terminal but may page the terminal in the group paging manner, it may reduce a paging failure and improve a reliability of paging the terminal in the group paging manner.

It should be noted that, those skilled in the art may understand that, the method provided in embodiments of the disclosure may be executed independently or may be executed in combination with some methods in embodiments of the disclosure or some methods in the related art.

In some embodiments, the first terminal capability information is further configured for a network to determine grouping information for paging the terminal in the group paging manner.

In some embodiments, the network side may determine a plurality of groups and each of the plurality of groups has corresponding group identifier information. The group identifier information corresponding to the group determined may be carried in the first terminal capability information. In this way, the network side may determine the grouping information for paging the terminal in the group paging manner.

In some embodiments, the first terminal capability information includes at least one of:

first information for indicating a capability that the terminal supports or does not support paging the terminal in the group paging manner:

second information for indicating a capability that the terminal supports or does not support grouping according to a statistical probability value of the terminal being paged: or third information for indicating a capability that the terminal supports or does not support grouping according to a probability level of a statistical probability value of the terminal being paged.

In some embodiments, the first terminal capability information may further include:

fourth information for indicating that a capability the terminal supports or does not support paging the terminal in the group paging manner according to a paging probability allocated by the network: and if the capability indicates that the terminal does not support, the network is unable to allocate the paging probability to the terminal for the group paging.

In some embodiments, a value of an information field is used to indicate the capability that the terminal supports or does not support paging the terminal in the group paging manner. For example, in response to the value of the information field of the first information being a first value, it indicates the capability that the terminal supports paging the terminal in the group paging manner. Alternatively, in response to the value of the information field of the first information being a second value, it indicates the capability that the terminal does not support paging the terminal in the group paging manner.

In some embodiments, in this case, the terminal is paged in the group paging manner, that is, the network allocates a group ID or a group set ID to the terminal.

In some embodiments, the terminal may perform the statistics to acquire the probability value of the terminal being paged. If the terminal supports the capability of grouping according to the statistical probability value of the terminal being paged, the network side may perform a paging grouping according to the probability value of the terminal being paged which is acquired by the statistics of the terminal.

In some embodiments, in response to the probability of the terminal being paged being less than a probability threshold, it is determined that the terminal belongs to a first group: or in response to the probability of the terminal being paged being greater than the probability threshold, it is determined that the terminal belongs to a second group. Paging resources configured for the first group and the second group are different. It should be noted that, the first terminal capability information indicates the capability that the terminal supports grouping according to the statistical probability value of the terminal being paged.

In some embodiments, the first terminal capability information may indicate the probability of the terminal being paged. The probability of the terminal being paged may be a probability of the terminal being paged within a predetermined period of time.

In some embodiments, the terminal may perform the statistics to acquire the probability value of the terminal being paged and determine the probability level of the probability value of the terminal being paged according to the probability value. If the terminal supports the capability that the terminal supports grouping according to the probability level of the statistical probability value of the terminal being paged, the network side may perform the paging grouping according to the probability level of the probability value of the terminal being paged which is acquired by the statistics of the terminal.

In some embodiments, the probability level of the terminal being paged may be divided into a low level, a medium level, and a high level. In some embodiments, in response to the probability level of the probability of the terminal being paged being the low level, it is determined that the group to which the terminal belongs is a first group: or in response to the probability level of the probability of the terminal being paged is the medium level, it is determined that the group to which the terminal belongs is a second group: or in response to the probability level of the probability of the terminal being paged is the high level, it is determined that the group to which the terminal belongs is a third group. Paging resources for the first group, the second group, and the third group are different. It should be noted that, the first terminal capability information may indicate the capability that the terminal supports grouping according to the probability level of the statistical probability value of the terminal being paged.

It should be noted that, those skilled in the art may understand that, the method provided in embodiments of the disclosure may be executed independently or may be executed in combination with some methods in embodiments of the disclosure or some methods in the related art.

Figure 3:
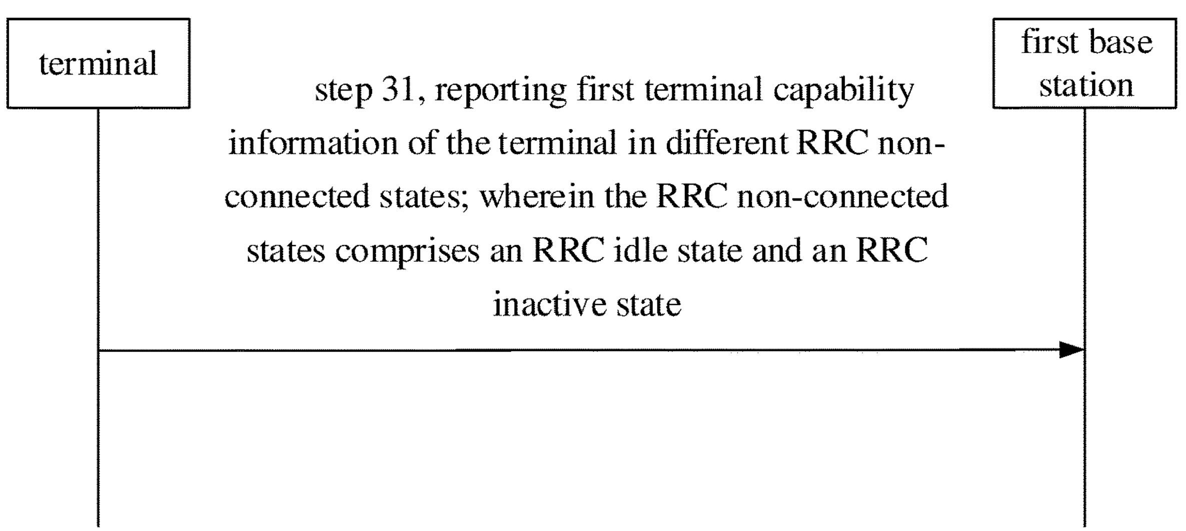
FIG. 3 is a flowchart illustrating a method for reporting terminal capability information according to some embodiments.

As illustrated in FIG. 3, a method for reporting terminal capability information is provided in some embodiments. The method is performed by the terminal. The method includes the following step At step 31, first terminal capability information of the terminal in different RRC non-connected states is reported. The RRC non-connected states include an RRC idle state and an RRC inactive state.

In some embodiments, the first terminal capability information may be determined for different RRC non-connected states.

In some embodiments, the terminal may determine that when the terminal is in the RRC idle state, the terminal supports paging the terminal in the group paging manner. Alternatively, the terminal may determine that when the terminal is in the RRC idle state, the terminal does not support paging the terminal in the group paging manner.

In some embodiments, the terminal may determine that when the terminal is in the RRC inactive state, the terminal supports paging the terminal in the group paging manner. Alternatively, the terminal may determine that when the terminal is in the RRC inactive state, the terminal does not support paging the terminal in the group paging manner.

In this way, the network may determine whether the terminal in different RRC non-connected states supports paging the terminal in the group paging manner according to the first terminal capability information.

In some embodiments, the first terminal capability information in the RRC idle state may be the same as the first terminal capability information of the terminal in the RRC inactive state.

It should be noted that, those skilled in the art may understand that, the method provided in embodiments of the disclosure may be executed independently or may be executed in combination with some methods in embodiments of the disclosure or some methods in the related art.

Figure 4:
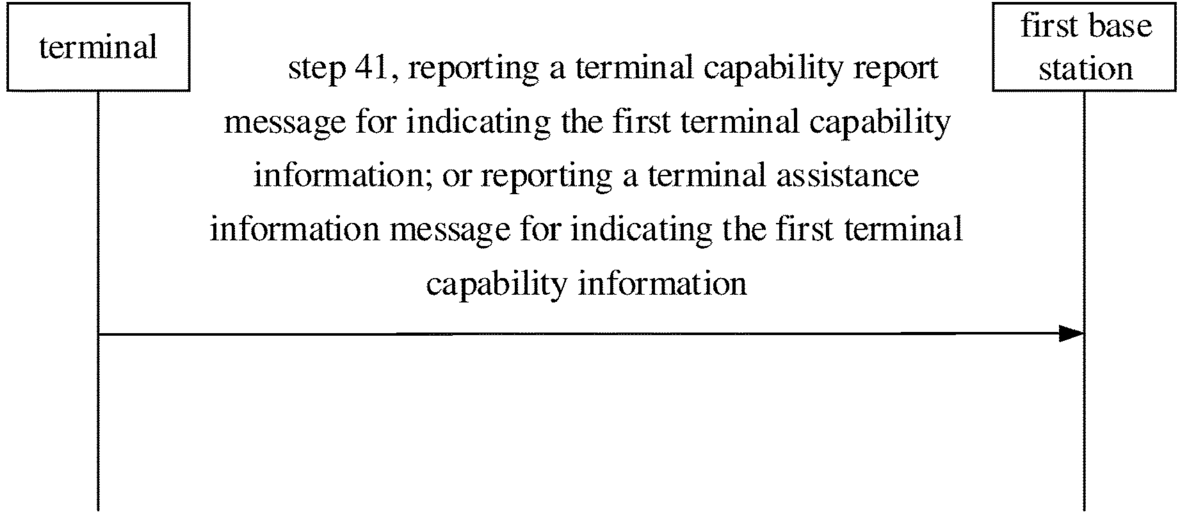
FIG. 4 is a flowchart illustrating a method for reporting terminal capability information according to some embodiments.

As illustrated in FIG. 4, a method for reporting terminal capability information is provided in some embodiments. The method is performed by the terminal. The method includes the following step.

At step 41, a terminal capability report message for indicating the first terminal capability information is reported, or a terminal assistance information message for indicating the first terminal capability information is reported.

In some embodiments, the terminal reports the terminal assistance information message when expecting to leave the RRC connected state.

In some embodiments, when an expected target RRC non-connected state in a release preference item reported by the terminal is an RRC idle state, the terminal assistance information message reported is a report message of a capability for the terminal in the RRC idle state.

In some embodiments, when an expected target RRC non-connected state in a release preference item reported by the terminal is an RRC inactive state, the terminal assistance information message reported is a report message of a capability for the terminal in the RRC inactive state.

In some embodiments, when an expected target RRC non-connected state in a release preference item reported by the terminal is an RRC non-connected state, the terminal assistance information message reported is a report message of a capability for the terminal in the RRC inactive state and the terminal in the RRC idle state.

It should be noted that, those skilled in the art may understand that, the method provided in embodiments of the disclosure may be executed independently or may be executed in combination with some methods in embodiments of the disclosure or some methods in the related art.

In some embodiments, in response to a desired state indicated by the terminal assistance information message being an RRC idle state, the first terminal capability information is terminal capability information of the terminal in the RRC idle state.

Alternatively, in response to a desired state indicated by the terminal assistance information message being an RRC inactive state, the first terminal capability information is terminal capability information of the terminal in the RRC inactive state.

Alternatively, in response to a desired state indicated by the terminal assistance information message being an RRC non-connected state, the first terminal capability information is terminal capability information of the terminal in the RRC non-connected state. The RRC non-connected state includes an RRC idle state and an RRC inactive state.

In some embodiments, if the first terminal capability information is terminal capability information of the terminal in the RRC idle state, the network may determine that the terminal in the RRC idle state supports or does not support paging the terminal in the group paging manner according to the first terminal capability information.

In some embodiments, if the first terminal capability information is terminal capability information of the terminal in the RRC inactive state, the network may determine that the terminal in the RRC inactive state supports or does not support paging the terminal in the group paging manner according to the first terminal capability information.

In some embodiments, if the first terminal capability information is terminal capability information of the terminal in the RRC non-connected state, the network may determine that the terminal in the RRC non-connected state supports or does not support paging the terminal in the group paging manner according to the first terminal capability information.

Figure 5:
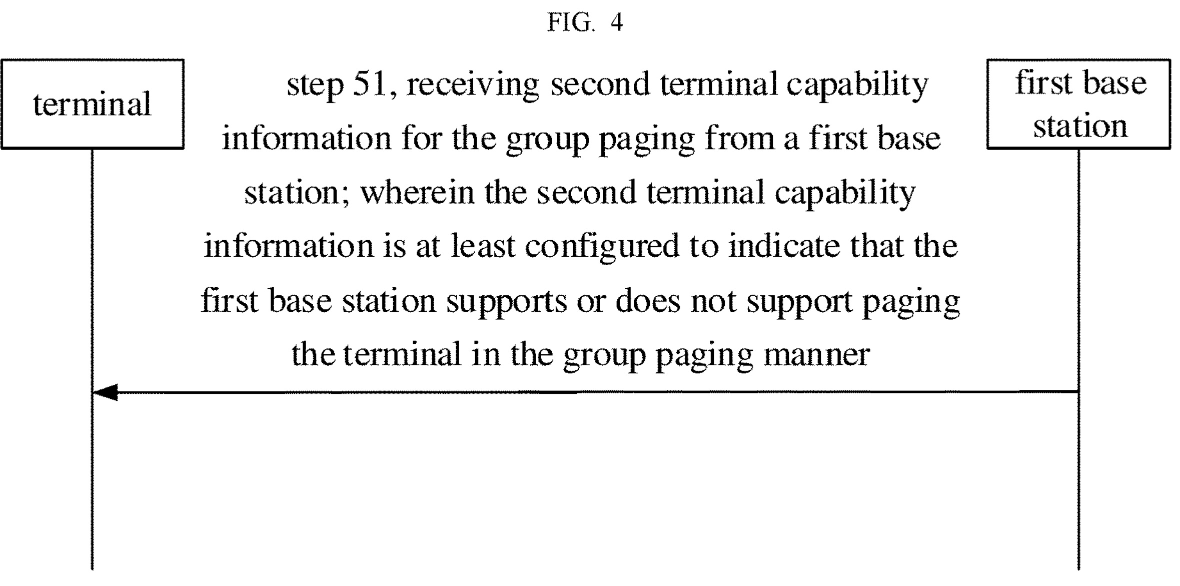
FIG. 5 is a flowchart illustrating a method for reporting terminal capability information according to some embodiments.

As illustrated in FIG. 5, a method for reporting terminal capability information is provided in some embodiments. The method is performed by the terminal. The method includes the following step.

At step 51, second terminal capability information for the group paging from a first base station is received.

The second terminal capability information is at least configured to indicate that the first base station supports or does not support paging the terminal in the group paging manner.

In some embodiments, the first base station sends the second terminal capability information for the group paging, in response to the terminal establishing an RRC connection with the first base station. The second terminal capability information may indicate that the terminal supports paging the terminal in the group paging manner. Alternatively, the second terminal capability information may indicate that the terminal does not support paging the terminal in the group paging manner.

In some embodiments, an RRC message for indicating the second terminal capability information from the base station may be received.

It should be noted that, those skilled in the art may understand that, the method provided in embodiments of the disclosure may be executed independently or may be executed in combination with some methods in embodiments of the disclosure or some methods in the related art.

As illustrated in FIG. 6, a method for reporting terminal capability information is provided in some embodiments. The method is performed by the terminal. The method includes the following steps.

At step 61, it is determined that the terminal does not support paging the terminal in the group paging manner, or the first base station does not support paging the terminal in the group paging manner according to the second terminal capability information.

At step 62, a paging message is received according to preset grouping.

In some embodiments, the terminal in the RRC connected state may receive the second terminal capability information for the group paging from the first base station. The second terminal capability information is at least configured to indicate that the first base station supports or does not support paging the terminal in a group paging manner. In some embodiments, when the terminal determines that the terminal does not support paging the terminal in the group paging manner after receiving the second terminal capability information, the terminal may receive the paging message according to the preset grouping. In other embodiments, it is determined that the first base station does not support paging the terminal in the group paging manner according to the second terminal capability information: and the paging message is received according to the preset grouping. The preset grouping may be a group preconfigured. The first base station may send the paging message to the terminal by using resources in the group. In some embodiments, the paging message sent according to the preset grouping may be carried by a power-saving signal. In some embodiments, the paging message may be carried by other power-saving signal than the power-saving signal corresponding to the paging group. For example, the paging message may be carried by a common power-saving signal.

In some embodiments, when it is determined that the terminal does not support paging the terminal in the group paging manner, the terminal may receive the paging message according to a no-grouping solution. In other embodiments, when it is determined that the first base station does not support paging the terminal in the group paging manner according to the second terminal capability information, the terminal may receive the paging message according to the no-grouping solution. In some embodiments, if a paging advance indication is used, the paging advance indication may be carried by a common power-saving signal. In this case, the common power-saving signal does not carry grouping information.

It should be noted that, those skilled in the art may understand that, the method provided in embodiments of the disclosure may be executed independently or may be executed in combination with some methods in embodiments of the disclosure or some methods in the related art.

As illustrated in FIG. 7, a method for reporting terminal capability information is provided in some embodiments. The method is performed by the first base station. The method includes the following step.

At step 71, first terminal capability information for group paging is received.

The first terminal capability information is at least configured to indicate that a terminal supports or does not support paging the terminal in a group paging manner.

The terminal may be but not limited to a mobile phone, a wearable device, a vehicle-mounted terminal, an RSU, a smart home terminal, an industrial sensing device and/or a medical device.

It should be noted that, the base station involved in the disclosure may be an access device where the terminal accesses the network. These may be various types of base stations such as a 3G network base station, a 4G network base station, a 5G network base station, or other evolutionary base station.

In some embodiments, the group paging may be that the network pages all terminals in one group by sending one group paging message, without sending the paging message separately for each terminal. After receiving the group paging message, the terminal determines whether it belongs to a paged group, and if yes, the group paging message is responded, and if not, the group paging message is ignored.

In some embodiments, there may be a plurality of groups for the group paging. Different groups may be configured with different paging resources. The terminal may belong to a certain group in the plurality of groups. Which group the terminal belongs to may be determined by the base station or a certain network element in the core network.

In some embodiments, which group the terminal belongs to may be determined by the base station or the network element in the core network. The first terminal capability information indicates a capability that the terminal supports paging the terminal in the group paging manner.

In some embodiments, only when the terminal has the capability that supports paging the terminal in the group paging manner, the network side may page the terminal in the group paging manner. When the terminal does not have the capability that supports paging the terminal in the group paging manner, the network side may not page the terminal in the group paging manner. When the network side may not page the terminal in the group paging manner, the network side may not allocate grouping information to the terminal. The grouping information is configured to indicate the group to which the terminal belongs.

In some embodiments, the network side may determine the group to which the terminal belongs according to a probability of the terminal being paged. The network side may refer to the base station or the core network device. In some embodiments, in response to the probability of the terminal being paged being less than a probability threshold, it is determined that the terminal belongs to a first group: or in response to the probability of the terminal being paged being greater than the probability threshold, it is determined that the terminal belongs to a second group. Paging resources configured for the first group and the second group are different. It should be noted that, the first terminal capability information may indicate a capability that the terminal supports grouping according to the statistical probability value of the terminal being paged.

In some embodiments, the network side may determine the group to which the terminal belongs according to a probability level of the probability of the terminal being paged. In some embodiments, the probability level of the probability of the terminal being paged may be divided into a low level, a medium level, and a high level. In some embodiments, in response to the probability level of the probability of the terminal being paged being the low level, it is determined that the group to which the terminal belongs is a first group: or in response to the probability level of the probability of the terminal being paged is the medium level, it is determined that the group to which the terminal belongs is a second group: or in response to the probability level of the probability of the terminal being paged is the high level, it is determined that the group to which the terminal belongs is a third group. Paging resources configured for the first group, the second group, and the third group are different. It should be noted that, the first terminal capability information may indicate a capability that the terminal supports grouping according to the probability level of the statistical probability value of the terminal being paged. Different probability levels correspond to different probability ranges. For example, the low level corresponds to probabilities a to b, the medium level corresponds to probabilities c to d, and the high level corresponds to probabilities e to f. a is less than b, b is less than c, c is less than d, d is less than e, and e is less than f.

It should be noted that, the group may be a group to which the terminal belongs, which is configured according to a preset rule when the terminal is paged in the group paging manner. There may be a plurality of groups.

In some embodiments, the first terminal capability information for the group paging is reported in response to the terminal establishing an RRC connection with the first base station. The first base station receives the first terminal capability information. The first terminal capability information may indicate that the terminal supports paging the terminal in the group paging manner. Alternatively, the first terminal capability information may indicate that the terminal does not support paging the terminal in the group paging manner.

In some embodiments, the first terminal capability information of the terminal in different RRC non-connected states may be different. The RRC non-connected states include an RRC idle state and/or an RRC inactive state. In some embodiments, the first terminal capability information may indicate that when the terminal is in an RRC idle state, the terminal supports paging the terminal in the group paging manner. Alternatively, the first terminal capability information may indicate that when the terminal is in an RRC idle state, the terminal does not support paging the terminal in the group paging manner. Alternatively, the first terminal capability information may indicate that when the terminal is in an RRC inactive state, the terminal supports paging the terminal in the group paging manner. Alternatively, the first terminal capability information may indicate that when the terminal is in an RRC inactive state, the terminal does not support paging the terminal in the group paging manner.

In some embodiments, the first terminal capability information of the terminal in the RRC idle state is the same as the first terminal capability information of the terminal in the RRC inactive state.

In some embodiments, a terminal capability report message for indicating the first terminal capability information may be reported. In other embodiments, a terminal assistance information message for indicating the first terminal capability information may be reported.

It should be noted that, when the terminal assistance information message for indicating the first terminal capability information is reported, in response to a desired state indicated by the terminal assistance information message being an RRC idle state, the first terminal capability information is terminal capability information of the terminal in the RRC idle state. Alternatively, in response to a desired state indicated by the terminal assistance information message being an RRC inactive state, the first terminal capability information is terminal capability information of the terminal in the RRC inactive state. Alternatively, in response to a desired state indicated by the terminal assistance information message being an RRC non-connected state, the first terminal capability information is terminal capability information of the terminal in the RRC inactive state. The RRC non-connected state includes an RRC idle state and an RRC inactive state.

In some embodiments, the terminal in the RRC connected state may receive second terminal capability information for the group paging from the first base station. The second terminal capability information is at least configured to indicate that the first base station supports or does not support paging the terminal in the group paging manner. In some embodiments, when the terminal determines that the terminal does not support paging the terminal in the group paging manner after receiving the second terminal capability information, the terminal may receive a paging message according to a preset group. In other embodiments, it is determined that the first base station does not support paging the terminal in the group paging manner according to the second terminal capability information: and a paging message is received according to a preset group. The preset group may be preconfigured. The first base station may send the paging message to the terminal by using resources in the group. In some embodiments, the paging message sent according to the preset group may be carried by a power-saving signal. In some embodiments, the paging message may be carried by other power-saving signal than the power-saving signal corresponding to the paging group. For example, the paging message may be carried by a common power-saving signal.

In some embodiments, when it is determined that the terminal does not support paging the terminal in the group paging manner, the terminal may receive the paging message according to a no-grouping solution. In other embodiments, when it is determined that the first base station does not support paging the terminal in the group paging manner according to the second terminal capability information, the terminal may receive the paging message according to the no-grouping solution. In some embodiments, if a paging advance indication is used, the paging advance indication may be carried by a common power-saving signal. In this case, the common power-saving signal does not carry grouping information.

It should be noted that, those skilled in the art may understand that, the method provided in embodiments of the disclosure may be executed independently or may be executed in combination with some methods in embodiments of the disclosure or some methods in the related art.

As illustrated in FIG. 8, a method for reporting terminal capability information is provided in some embodiments. The method is performed by the first base station. The method includes the following step.

At step 81, grouping information for paging the terminal in the group paging manner is determined according to the first terminal capability information.

In some embodiments, the first base station may determine a plurality of group, and each of the plurality of groups has corresponding group identifier information. The group identifier information corresponding to the group determined may be carried in the first terminal capability information. In this way, the first base station may determine the grouping information for paging the terminal in the group paging manner.

In some embodiments, the first terminal capability information includes at least one of:

first information for indicating a capability that the terminal supports or does not support paging the terminal in the group paging manner:

second information for indicating a capability that the terminal supports or does not support grouping according to a statistical probability value of the terminal being paged: or third information for indicating a capability that the terminal supports or does not support grouping according to a probability level of a statistical probability value of the terminal being paged.

In some embodiments, a value of an information field indicates the capability that the terminal supports or does not support paging the terminal in the group paging manner. For example, in response to the value of the information field of the first information being the first value, it indicates the capability that the terminal supports paging the terminal in the group paging manner. Alternatively, in response to the value of the information field of the first information being the second value, it indicates the capability that the terminal does not support paging the terminal in the group paging manner.

In some embodiments, the terminal may perform the statistics to acquire the probability value of the terminal being paged. If the terminal supports the capability of grouping according to the statistical probability value of the terminal being paged, the network side may perform a paging grouping according to the probability value of the terminal being paged which is acquired by the statistics of the terminal.

In some embodiments, in response to the probability of the terminal being paged being less than a probability threshold, it is determined that the terminal belongs to a first group: or in response to the probability of the terminal being paged being greater than the probability threshold, it is determined that the terminal belongs to a second group. Paging resources configured for the first group and the second group are different. It should be noted that, the first terminal capability information indicates the capability that the terminal supports grouping according to the statistical probability value of the terminal being paged.

In some embodiments, the first terminal capability information may indicate the probability of the terminal being paged. The probability of the terminal being paged may be a probability of the terminal being paged within a predetermined period of time.

In some embodiments, the terminal may perform the statistics to acquire the probability value of the terminal being paged, and determine the probability level of the probability value of the terminal being paged according to the probability value. If the terminal supports the capability that the terminal supports grouping according to the probability level of the statistical probability value of the terminal being paged, the network side may perform the paging grouping according to the probability level of the probability value of the terminal being paged which is acquired by the statistics of the terminal.

In some embodiments, the probability level of the probability of the terminal being paged may be divided into a low level, a medium level, and a high level. In some embodiments, in response to the probability level of the probability of the terminal being paged being the low level, it is determined that the group to which the terminal belongs is a first group: or in response to the probability level of the probability of the terminal being paged is the medium level, it is determined that the group to which the terminal belongs is a second group: or in response to the probability level of the probability of the terminal being paged is the high level, it is determined that the group to which the terminal belongs is a third group. Paging resources configured for the first group, the second group, and the third group are different. It should be noted that, the first terminal capability information may indicate a capability that the terminal supports grouping according to the probability level of the statistical probability value of the terminal being paged.

It should be noted that, those skilled in the art may understand that, the method provided in embodiments of the disclosure may be executed independently or may be executed in combination with some methods in embodiments of the disclosure or some methods in the related art.

Figures 9, 10, 11:
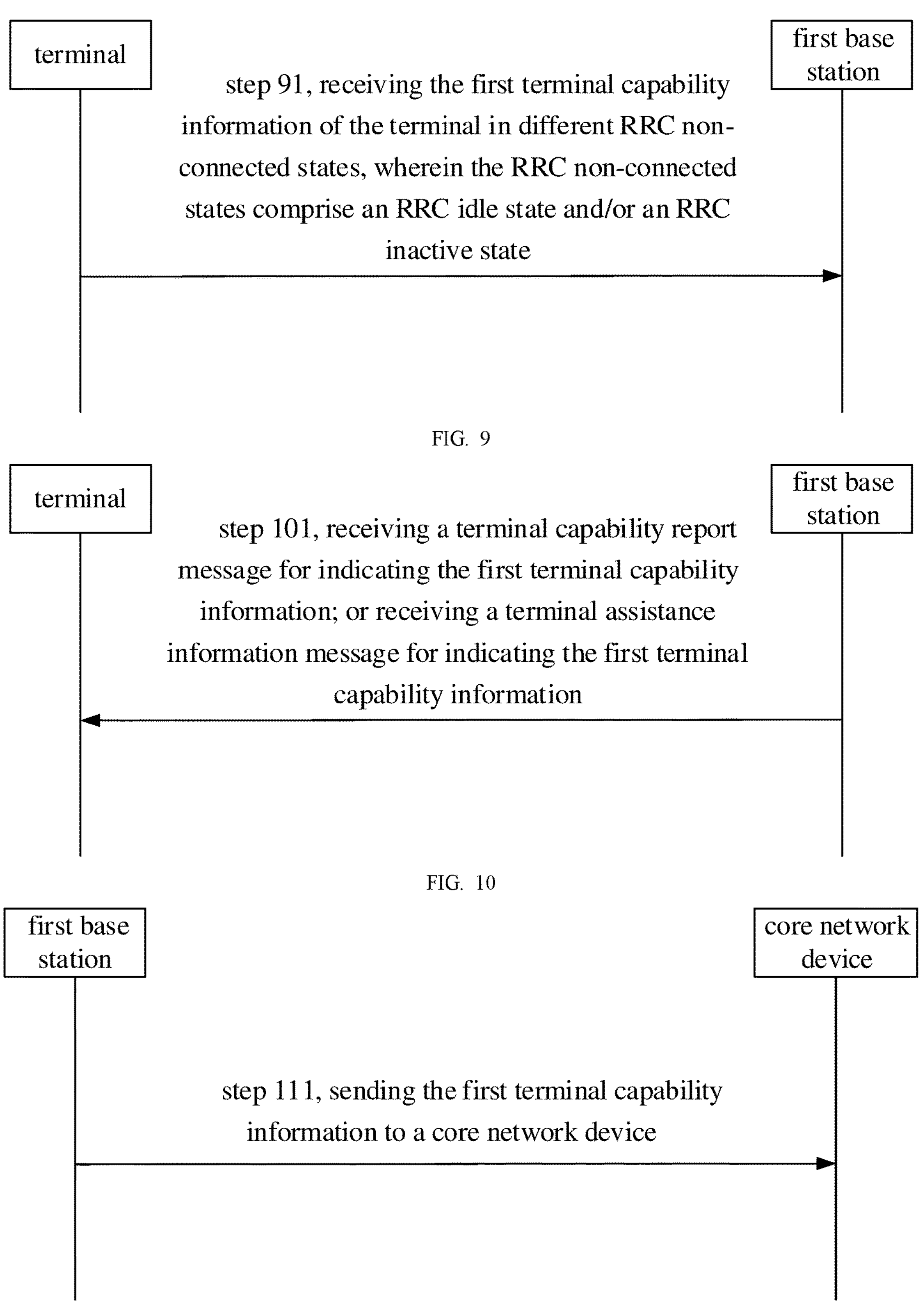
FIG. 9 is a flowchart illustrating a method for reporting terminal capability information according to some embodiments.
FIG. 10 is a flowchart illustrating a method for reporting terminal capability information according to some embodiments.
FIG. 11 is a flowchart illustrating a method for reporting terminal capability information according to some embodiments.

As illustrated in FIG. 9, a method for reporting terminal capability information is provided in some embodiments. The method is performed by the first base station. The method includes the following step.

At step 91, first terminal capability information of the terminal in different RRC non-connected states is received. The RRC non-connected states include an RRC idle state and and/or an RRC inactive state.

In some embodiments, the first terminal capability information may be determined for different RRC non-connected states.

In some embodiments, the terminal may determine that when the terminal is in the RRC idle state, the terminal supports paging the terminal in the group paging manner. Alternatively, the terminal may determine that when the terminal is in the RRC idle state, the terminal does not support paging the terminal in the group paging manner.

In some embodiments, the terminal may determine that when the terminal is in the RRC inactive state, the terminal supports paging the terminal in the group paging manner. Alternatively, the terminal may determine that when the terminal is in the RRC inactive state, the terminal does not support paging the terminal in the group paging manner.

In this way, the first base station may determine whether the terminal in different RRC non-connected states supports paging the terminal in the group paging manner according to the first terminal capability information.

In some embodiments, the first terminal capability information in the RRC idle state may be the same as the first terminal capability information of the terminal in the RRC inactive state.

It should be noted that, those skilled in the art may understand that, the method provided in embodiments of the disclosure may be executed independently or may be executed in combination with some methods in embodiments of the disclosure or some methods in the related art.

As illustrated in FIG. 10, a method for reporting terminal capability information is provided in some embodiments. The method is performed by the first base station. The method includes the following step.

At step 101, a terminal capability report message for indicating the first terminal capability information is received, or a terminal assistance information message for indicating the first terminal capability information is received.

In some embodiments, the terminal reports the terminal assistance information message when expecting to leave the RRC connected state.

In some embodiments, when an expected target RRC non-connected state in a release preference item reported by the terminal is an RRC idle state, the terminal assistance information message received by the terminal is a report message of a capability for the terminal in the RRC idle state.

In some embodiments, when an expected target RRC non-connected state in a release preference item reported by the terminal is an RRC inactive state, the terminal assistance information message received by the terminal is a report message of a capability for the terminal in the RRC inactive state.

In some embodiments, when an expected target RRC non-connected state in a release preference item reported by the terminal is an RRC non-connected state, the terminal assistance information message received by the terminal is a report message of a capability for the terminal in the RRC inactive state and the terminal in the RRC idle state.

It should be noted that, those skilled in the art may understand that, the method provided in embodiments of the disclosure may be executed independently or may be executed in combination with some methods in embodiments of the disclosure or some methods in the related art.

In some embodiments, in response to a desired state indicated by the terminal assistance information message being an RRC idle state, the first terminal capability information is terminal capability information of the terminal in the RRC idle state.

Alternatively, in response to a desired state indicated by the terminal assistance information message being an RRC inactive state, the first terminal capability information is terminal capability information of the terminal in the RRC inactive state.

Alternatively, in response to a desired state indicated by the terminal assistance information message being an RRC non-connected state, the first terminal capability information is terminal capability information of the terminal in the RRC non-connected state. The RRC non-connected state includes an RRC idle state and an RRC inactive state.

In some embodiments, if the first terminal capability information is terminal capability information of the terminal in the RRC idle state, the first base station may determine that the terminal in the RRC idle state supports or does not support paging the terminal in the group paging manner according to the first terminal capability information.

In some embodiments, if the first terminal capability information is terminal capability information of the terminal in the RRC inactive state, the first base station may determine that the terminal in the RRC inactive state supports or does not support paging the terminal in the group paging manner according to the first terminal capability information.

In some embodiments, if the first terminal capability information is terminal capability information of the terminal in the RRC non-connected state, the first base station may determine that the terminal in the RRC non-connected state supports or does not support paging the terminal in the group paging manner according to the first terminal capability information.

As illustrated in FIG. 11, a method for reporting terminal capability information is provided in some embodiments. The method is performed by the first base station. The method includes the following step.

At step 111, the first terminal capability information is sent to a core network device.

In some embodiments, a terminal capability information indication message (UE CAPABILITY INFO INDICATION) for indicating the first terminal capability information may be sent to the core network.

In some embodiments, an RRC inactive transition report message (INACTIVE TRANSITION REPORT) for indicating the first terminal capability information may be sent to the core network.

It should be noted that, those skilled in the art may understand that, the method provided in embodiments of the disclosure may be executed independently or may be executed in combination with some methods in embodiments of the disclosure or some methods in the related art.

A method for reporting terminal capability information is provided in some embodiments. The method includes: the first base station acquires first terminal capability information from the core network device.

In a scenario, the terminal re-selects to the first base station when the RRC connection is released. The first base station may acquire the first terminal capability information from the core network device. The first terminal capability information may be sent by the connected base station before releasing to the core network device. In some embodiments, the first terminal capability information may be sent from the core network to the first base station by a paging message.

In some embodiments, when the core network device sends the paging message for indicating the first terminal capability information to the first base station, if the terminal capability information is carried in the paging message, it indicates that the terminal supports paging the terminal in the group paging manner. If the terminal capability information is not carried in the paging message, it indicates that the terminal does not support paging the terminal in the group paging manner. In some embodiments, if the first terminal capability information is carried in the paging message, it indicates that the terminal supports paging the terminal in the group paging manner. If the first terminal capability information is not carried in the paging message, it indicates that the terminal does not support paging the terminal in the group paging manner.

In some embodiments, the paging message may explicitly indicate the first terminal capability information. In some embodiments, the paging message may carry an identifier for indicating the first terminal capability information. For example, when the identifier is a first identifier, the first terminal capability information indicates that the terminal supports paging the terminal in the group paging manner: and when the identifier is a second identifier, the first terminal capability information indicates that the terminal does not support paging the terminal in the group paging manner.

In some embodiments, the paging message may implicitly indicate the first terminal capability information. In some embodiments, when grouping information and probability information for paging is carried in the paging message, the first terminal capability implicitly indicates that the terminal supports paging the terminal in the group paging manner: and when grouping information and probability information for paging is not carried in the paging message, the first terminal capability implicitly indicates that the terminal does not support paging the terminal in the group paging manner In some embodiments, the first terminal capability information from the core network device may be received by one of: an initial context setup request message (INITIAL CONTEXT SETUP REQUEST), a terminal context modification request message (UE CONTEXT MODIFICATION REQUEST), a handover request message (HANDOVER REQUEST), or a path switch request acknowledge message (PATH SWITCH REQUEST ACKNOWLEDGE).

A method for reporting terminal capability information is provided in some embodiments. The method includes: the first base station may, as an anchor base station, acquire the first terminal capability information.

In some embodiments, the core network sends the first terminal capability information to the anchor base station of the first base station. In some embodiments, the core network sends the paging message to the first base station.

In some embodiments, the paging message may explicitly indicate the first terminal capability information. In some embodiments, the paging message may carry an identifier for indicating the first terminal capability information. For example, when the identifier is a first identifier, the first terminal capability information indicates that the terminal supports paging the terminal in the group paging manner: and when the identifier is a second identifier, the first terminal capability information indicates that the terminal does not support paging the terminal in the group paging manner.

Figures 12, 13, 14:
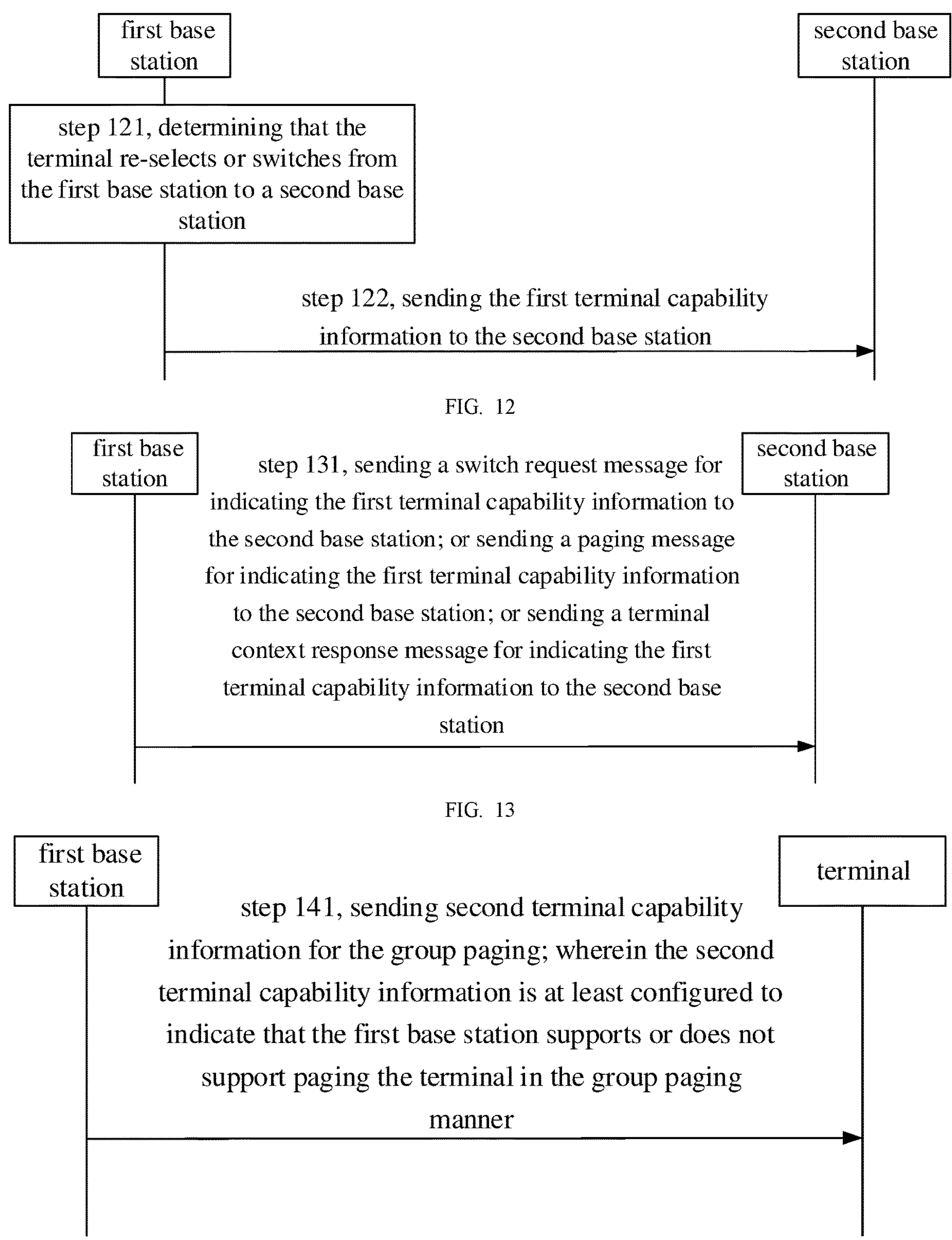
FIG. 12 is a flowchart illustrating a method for reporting terminal capability information according to some embodiments.
FIG. 13 is a flowchart illustrating a method for reporting terminal capability information according to some embodiments.
FIG. 14 is a flowchart illustrating a method for reporting terminal capability information according to some embodiments.

In some embodiments, the paging message may implicitly indicate the first terminal capability information. In some embodiments, when grouping information and probability information for paging is carried in the paging message, the first terminal capability information indicates that the terminal supports paging the terminal in the group paging manner: when grouping information and probability information for paging is not carried in the paging message, the first terminal capability information indicates that the terminal does not support paging the terminal in the group paging manner As illustrated in FIG. 12, a method for reporting terminal capability information is provided in some embodiments. The method is performed by the first base station. The method includes the following steps.

At step 121, it is determined that the terminal re-selects or switches from the first base station to a second base station.

At step 122, the first terminal capability information is sent to the second base station.

In some embodiments, when the first base station receives the first terminal capability information reported by the terminal and the terminal re-selects or switches from the first base station to the second base station, the first terminal capability information is sent to the second base station.

In some embodiments, when the first base station receives the first terminal capability information sent by the core network and the terminal re-selects or switches from the first base station to the second base station, the first terminal capability information is sent to the second base station.

In some embodiments, a switch request message for indicating the first terminal capability information is sent to the second base station.

In some embodiments, a paging message for indicating the first terminal capability information is sent to the second base station. The second base station may be a non-anchor base station when the terminal in the RRC inactive state re-selects. In this case, the first base station is an anchor base station.

In some embodiments, a terminal context response message for indicating the first terminal capability information is sent to the second base station. The second base station may be a non-anchor base station when the terminal in the RRC inactive state re-selects. In this case, the first base station is an anchor base station.

It should be noted that, those skilled in the art may understand that, the method provided in embodiments of the disclosure may be executed independently or may be executed in combination with some methods in embodiments of the disclosure or some methods in the related art.

As illustrated in FIG. 13, a method for reporting terminal capability information is provided in some embodiments. The method is performed by the first base station. The method includes the following step.

At step 131, a switch request message for indicating the first terminal capability information is sent to the second base station, or a paging message for indicating the first terminal capability information is sent to the second base station, or a terminal context response message for indicating the first terminal capability information is sent to the second base station.

In some embodiments, when the paging message for indicating the first terminal capability information is sent to the second base station, if the terminal capability information is carried in the paging message, it indicates that the terminal supports paging the terminal in the group paging manner. If the terminal capability information is not carried in the paging message, it indicates that the terminal does not support paging the terminal in the group paging manner. In some embodiments, if the first terminal capability information is carried in the paging message, it indicates that the terminal supports paging the terminal in the group paging manner. If the first terminal capability information is not carried in the paging message, it indicates that the terminal does not support paging the terminal in the group paging manner.

In some embodiments, the paging message may explicitly indicate the first terminal capability information. In some embodiments, the paging message may carry an identifier for indicating the first terminal capability information. For example, when the identifier is a first identifier, the first terminal capability information indicates that the terminal supports paging the terminal in the group paging manner: and when the identifier is a second identifier, the first terminal capability information indicates that the terminal does not support paging the terminal in the group paging manner.

In some embodiments, the paging message may implicitly indicate the first terminal capability information. In some embodiments, when grouping information and probability information for paging is carried in the paging message, the first terminal capability information indicates that the terminal supports paging the terminal in the group paging manner: and when grouping information and probability information for paging is not carried in the paging message, the first terminal capability information indicates that the terminal does not support paging the terminal in the group paging manner It should be noted that, those skilled in the art may understand that, the method provided in embodiments of the disclosure may be executed independently or may be executed in combination with some methods in embodiments of the disclosure or some methods in the related art.

As illustrated in FIG. 14, a method for reporting terminal capability information is provided in some embodiments. The method is performed by the first base station. The method includes the following step.

At step 141, second terminal capability information for the group paging is sent. The second terminal capability information is at least configured to indicate that the first base station supports or does not support paging the terminal in the group paging manner.

In some embodiments, the first base station sends the second terminal capability information for the group paging, in response to the terminal establishing an RRC connection with the first base station. The second terminal capability information may indicate that the terminal supports paging the terminal in the group paging manner. Alternatively, the second terminal capability information may indicate that the terminal does not support paging the terminal in the group paging manner.

In some embodiments, the terminal in the RRC connected state may receive the second terminal capability information for the group paging from the first base station. The second terminal capability information is at least configured to indicate that the first base station supports or does not support paging the terminal in the group paging manner. In some embodiments, when the terminal determines that the terminal does not support paging the terminal in the group paging manner after receiving the second terminal capability information, the terminal may receive the paging message according to the preset grouping. In other embodiments, it is determined that the first base station does not support paging the terminal in the group paging manner according to the second terminal capability information: and the paging message is received according to the preset grouping. The preset grouping may be a group preconfigured. The first base station may send the paging message to the terminal by using resources in the group. In some embodiments, the paging message sent according to the preset grouping may be carried by a power-saving signal. In some embodiments, the paging message may be carried by other power-saving signal than the power-saving signal corresponding to the paging group. For example, the paging message may be carried by a common power-saving signal.

In some embodiments, when it is determined that the terminal does not support paging the terminal in the group paging manner, the terminal may receive the paging message according to a no-grouping solution. In other embodiments, when it is determined that the first base station does not support paging the terminal in the group paging manner according to the second terminal capability information, the terminal may receive the paging message according to the no-grouping solution. In some embodiments, if a paging advance indication is used, the paging advance indication may be carried by a common power-saving signal. In this case, the common power-saving signal does not carry grouping information.

It should be noted that, those skilled in the art may understand that, the method provided in embodiments of the disclosure may be executed independently or may be executed in combination with some methods in embodiments of the disclosure or some methods in the related art.

Figures 15, 16, 17:
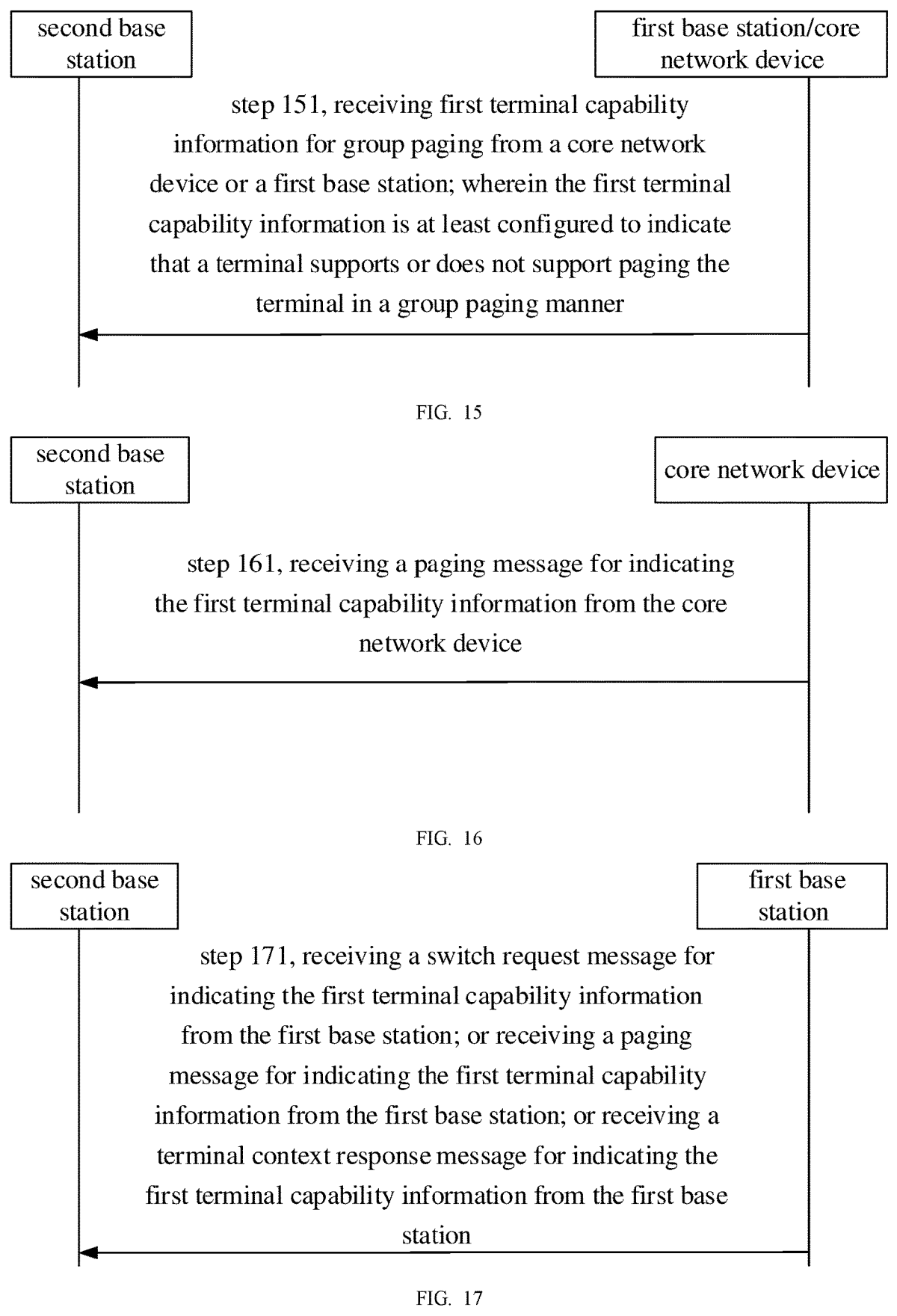

As illustrated in FIG. 15, a method for reporting terminal capability information is provided in some embodiments. The method is performed by the second base station. The method includes the following step.

At step 151, first terminal capability information for group paging is received from a core network device or a first base station. The first terminal capability information is at least configured to indicate that a terminal supports or does not support paging the terminal in a group paging manner.

The terminal may be but not limited to a mobile phone, a wearable device, a vehicle-mounted terminal, an RSU, a smart home terminal, an industrial sensing device and/or a medical device.

It should be noted that, the base station involved in the disclosure may be an access device where the terminal accesses the network. These may be various types of base stations such as a 3G network base station, a 4G network base station, a 5G network base station, or other evolutionary base station.

In some embodiments, the group paging may be that the network pages all terminals in one group by sending one group paging message, without sending the paging message separately for each terminal. After receiving the group paging message, the terminal determines whether it belongs to a paged group, and if yes, the group paging message is responded, and if not, the group paging message is ignored.

In some embodiments, there may be a plurality of groups for the group paging. Different groups may be configured with different paging resources. The terminal may belong to a certain group in the plurality of groups. Which group the terminal belongs to may be determined by the base station or a certain network element in the core network.

In some embodiments, which group the terminal belongs to may be determined by the base station or the network element in the core network. The first terminal capability information may indicate a capability that the terminal supports paging the terminal in the group paging manner. In some embodiments, only when the terminal has the capability that supports paging the terminal in the group paging manner, the network side may page the terminal in the group paging manner. When the terminal does not have the capability that supports paging the terminal in the group paging manner, the network side may not page the terminal in the group paging manner. When the network side may not page the terminal in the group paging manner, the network side may not allocate grouping information to the terminal. The grouping information is configured to indicate the group to which the terminal belongs.

In some embodiments, the network side may determine the group to which the terminal belongs according to a probability of the terminal being paged. The network side may refer to the base station or the core network device. In some embodiments, in response to the probability of the terminal being paged being less than a probability threshold, it is determined that the terminal belongs to a first group: or in response to the probability of the terminal being paged being greater than a probability threshold, it is determined that the terminal belongs to a second group. Paging resources configured for the first group and the second group are different. It should be noted that, the first terminal capability information may indicate a capability that the terminal supports grouping according to the statistical probability value of the terminal being paged.

In some embodiments, the network side may determine the group to which the terminal belongs according to a probability level of the probability of the terminal being paged. In some embodiments, the probability level of the probability of the terminal being paged may be divided into a low level, a medium level, and a high level. In some embodiments, in response to the probability level of the probability of the terminal being paged being the low level, it is determined that the group to which the terminal belongs is a first group: or in response to the probability level of the probability of the terminal being paged is the medium level, it is determined that the group to which the terminal belongs is a second group: or in response to the probability level of the probability of the terminal being paged is the high level, it is determined that the group to which the terminal belongs is a third group. Paging resources configured for the first group, the second group, and the third group are different. It should be noted that, the first terminal capability information may indicate a capability that the terminal supports grouping according to the probability level of the statistical probability value of the terminal being paged. Different probability levels correspond to different probability ranges. For example, the low level corresponds to probabilities a to b, the medium level corresponds to probabilities c to d, and the high level corresponds to probabilities e to f. a is less than b, b is less than c, c is less than d, d is less than e, and e is less than f. It should be noted that, the group may be a group to which the terminal belongs, which is configured according to a preset rule when the terminal is paged in the group paging manner. There may be a plurality of groups.

In some embodiments, the first terminal capability information for the group paging is reported in response to the terminal establishing an RRC connection with the first base station. The first terminal capability information may indicate that the terminal supports paging the terminal in the group paging manner. Alternatively, the first terminal capability information may indicate that the terminal does not support paging the terminal in the group paging manner.

In some embodiments, the first terminal capability information of the terminal in different RRC non-connected states may be different. The RRC non-connected states include an RRC idle state and/or an RRC inactive state. In some embodiments, the first terminal capability information may indicate that when the terminal is in an RRC idle state, the terminal supports paging the terminal in the group paging manner. Alternatively, the first terminal capability information may indicate that when the terminal is in an RRC idle state, the terminal does not support paging the terminal in the group paging manner. Alternatively, the first terminal capability information may indicate that when the terminal is in an RRC inactive state, the terminal supports paging the terminal in the group paging manner. Alternatively, the first terminal capability information may indicate that when the terminal is in an RRC inactive state, the terminal does not support paging the terminal in the group paging manner.

In some embodiments, the first terminal capability information of the terminal in the RRC idle state is the same as the first terminal capability information of the terminal in the RRC inactive state.

In some embodiments, when the first base station receives the first terminal capability information reported by the terminal and the terminal is switched from the first base station to the second base station, the first terminal capability information is sent to the second base station.

In some embodiments, when the first base station receives the first terminal capability information sent by the core network and the terminal is switched from the first base station to the second base station, the first terminal capability information is sent to the second base station.

In some embodiments, a switch request message for indicating the first terminal capability information is sent to the second base station. The second base station receives the switch request message for indicating the first terminal capability information.

In some embodiments, a paging message for indicating the first terminal capability information is sent to the second base station. The second base station receives the paging message for indicating the first terminal capability information.

In some embodiments, a terminal context response message for indicating the first terminal capability information is sent to the second base station. The second base station receives the paging message for indicating the first terminal capability information. The second base station may be an anchor base station when the terminal in the RRC inactive state re-selects.

In some embodiments, the first terminal capability information from the core network device may be received by one of: an initial context setup request message (INITIAL CONTEXT SETUP REQUEST), a terminal context modification request message (UE CONTEXT MODIFICATION REQUEST), a handover request message (HANDOVER REQUEST), or a path switch request acknowledge message (PATH SWITCH REQUEST ACKNOWLEDGE).

It should be noted that, those skilled in the art may understand that, the method provided in embodiments of the disclosure may be executed independently or may be executed in combination with some methods in embodiments of the disclosure or some methods in the related art.

As illustrated in FIG. 16, a method for reporting terminal capability information is provided in some embodiments. The method is performed by the second base station. The method includes the following step.

At step 161, a paging message for indicating the first terminal capability information is received from the core network device.

In some embodiments, when the core network device sends a paging message for indicating the first terminal capability information to the second base station, if the terminal capability information is carried in the paging message, it indicates that the terminal supports paging the terminal in the group paging manner. If the terminal capability information is not carried in the paging message, it indicates that the terminal does not support paging the terminal in the group paging manner. In some embodiments, if the first terminal capability information is carried in the paging message, it indicates that the terminal supports paging the terminal in the group paging manner. If the first terminal capability information is not carried in the paging message, it indicates that the terminal does not support paging the terminal in the group paging manner.

In some embodiments, the paging message may explicitly indicate the first terminal capability information. In some embodiments, the paging message may carry an identifier for indicating the first terminal capability information. For example, when the identifier is a first identifier, the first terminal capability information indicates that the terminal supports paging the terminal in the group paging manner: and when the identifier is a second identifier, the first terminal capability information indicates that the terminal does not support paging the terminal in the group paging manner.

In some embodiments, the paging message may implicitly indicate the first terminal capability information. In some embodiments, when grouping information and probability information for paging is carried in the paging message, the first terminal capability information indicates that the terminal supports paging the terminal in the group paging manner: and when grouping information and probability information for paging is not carried in the paging message, the first terminal capability information indicates that the terminal does not support paging the terminal in the group paging manner It should be noted that, those skilled in the art may understand that, the method provided in embodiments of the disclosure may be executed independently or may be executed in combination with some methods in embodiments of the disclosure or some methods in the related art.

As illustrated in FIG. 17, a method for reporting terminal capability information is provided in some embodiments. The method is performed by the second base station. The method includes the following step.

At step 171, a switch request message for indicating the first terminal capability information from the first base station is received, or a paging message for indicating the first terminal capability information is received from the first base station, or a terminal context response message for indicating the first terminal capability information from the first base station is received.

In some embodiments, when the first base station sends a paging message for indicating the first terminal capability information to the second base station, if the terminal capability information is carried in the paging message, it indicates that the terminal supports paging the terminal in the group paging manner. If the terminal capability information is not carried in the paging message, it indicates that the terminal does not support paging the terminal in the group paging manner. In some embodiments, if the first terminal capability information is carried in the paging message, it indicates that the terminal supports paging the terminal in the group paging manner. If the first terminal capability information is not carried in the paging message, it indicates that the terminal does not support paging the terminal in the group paging manner.

In some embodiments, the paging message may explicitly indicate the first terminal capability information. In some embodiments, the paging message may carry an identifier for indicating the first terminal capability information. For example, when the identifier is a first identifier, the first terminal capability information indicates that the terminal supports paging the terminal in the group paging manner: and when the identifier is a second identifier, the first terminal capability information indicates that the terminal does not support paging the terminal in the group paging manner.

In some embodiments, the paging message may implicitly indicate the first terminal capability information. In some embodiments, when grouping information and probability information for paging is carried in the paging message, the first terminal capability information indicates that the terminal supports paging the terminal in the group paging manner: and when grouping information and probability information for paging is not carried in the paging message, the first terminal capability information indicates that the terminal does not support paging the terminal in the group paging manner It should be noted that, those skilled in the art may understand that, the method provided in embodiments of the disclosure may be executed independently or may be executed in combination with some methods in embodiments of the disclosure or some methods in the related art.

As illustrated in FIG. 18, a method for reporting terminal capability information is provided in some embodiments. The method is performed by the second base station. The method includes the following step.

At step 181, grouping information for paging the terminal in the group paging manner is determined according to the first terminal capability information.

In some embodiments, the second base station may determine a plurality of groups and each of the plurality of groups has corresponding group identifier information. The group identifier information corresponding to the group determined may be carried in the first terminal capability information. In this way, the second base station may determine grouping information for paging the terminal in the group paging manner.

It should be noted that, those skilled in the art may understand that, the method provided in embodiments of the disclosure may be executed independently or may be executed in combination with some methods in embodiments of the disclosure or some methods in the related art.

In some embodiments, the first terminal capability information includes at least one of:

- first information for indicating a capability that the terminal supports or does not support paging the terminal in the group paging manner:
- second information for indicating a capability that the terminal supports or does not support grouping according to a statistical probability value of the terminal being paged: or
- third information for indicating a capability that the terminal supports or does not support grouping according to a probability level of a statistical probability value of the terminal being paged.

In some embodiments, a value of an information field indicates the capability that the terminal supports or does not support paging the terminal in the group paging manner. For example, in response to the value of the information field of the first information being the first value, it indicates the capability that the terminal supports paging the terminal in the group paging manner. Alternatively, in response to the value of the information field of the first information being the second value, it indicates the capability that the terminal does not support paging the terminal in the group paging manner.

In some embodiments, the terminal may perform the statistics to acquire the probability value of the terminal being paged. If the terminal supports the capability of grouping according to the statistical probability value of the terminal being paged, the network side may perform a paging grouping according to the probability value of the terminal being paged which is acquired by the statistics of the terminal.

In some embodiments, in response to the probability of the terminal being paged being less than a probability threshold, it is determined that the terminal belongs to a first group: or in response to the probability of the terminal being paged being greater than the probability threshold, it is determined that the terminal belongs to a second group. Paging resources configured for the first group and the second group are different. It should be noted that, the first terminal capability information may indicate the capability that the terminal supports grouping according to the statistical probability value of the terminal being paged.

In some embodiments, the first terminal capability information may indicate a probability of the terminal being paged. The probability of the terminal being paged may be a probability of the terminal being paged within a predetermined period of time.

In some embodiments, the terminal may perform the statistics to acquire the probability value of the terminal being paged and determine the probability level of the probability value of the terminal being paged according to the probability value. If the terminal supports capability that the terminal supports grouping according to the probability level of the statistical probability value of the terminal being paged, the network side may perform the paging grouping according to the probability level of the probability value of the terminal being paged which is acquired by the statistics of the terminal.

In some embodiments, the probability level of the terminal being paged may be divided into a low level, a medium level, and a high level. In some embodiments, in response to the probability level of the probability of the terminal being paged being the low level, it is determined that the group to which the terminal belongs is a first group: or in response to the probability level of the probability of the terminal being paged is the medium level, it is determined that the group to which the terminal belongs is a second group: or in response to the probability level of the probability of the terminal being paged is the high level, it is determined that the group to which the terminal belongs is a third group. Paging resources configured for the first group, the second group, and the third group are different. It should be noted that, the first terminal capability information may indicate the capability that the terminal supports grouping according to the probability level of the statistical probability value of the terminal being paged.

It should be noted that, those skilled in the art may understand that, the method provided in embodiments of the disclosure may be executed independently or may be executed in combination with some methods in embodiments of the disclosure or some methods in the related art.

As illustrated in FIG. 19, a method for reporting terminal capability information is provided in some embodiments. The method is performed by the second base station. The method includes the following step.

At step 191, first terminal capability information of the terminal in different RRC non-connected states is received. The RRC non-connected states include an RRC idle state and and/or an RRC inactive state.

In some embodiments, the terminal may determine first terminal capability information for the terminal in different RRC non-connected states.

In some embodiments, the terminal may determine that when the terminal is in the RRC idle state, the terminal supports paging the terminal in the group paging manner. Alternatively, the terminal may determine that when the terminal is in the RRC idle state, the terminal does not support paging the terminal in the group paging manner.

In some embodiments, the terminal may determine that when the terminal is in the RRC inactive state, the terminal supports paging the terminal in the group paging manner. Alternatively, the terminal may determine that when the terminal is in the RRC inactive state, the terminal does not support paging the terminal in the group paging manner.

In this way, the second base station may determine whether the terminal in different RRC non-connected states supports paging the terminal in the group paging manner according to the first terminal capability information.

In some embodiments, the first terminal capability information in the RRC idle state may be the same as the first terminal capability information of the terminal in the RRC inactive state.

It should be noted that, those skilled in the art may understand that, the method provided in embodiments of the disclosure may be executed independently or may be executed in combination with some methods in embodiments of the disclosure or some methods in the related art.

In some embodiments, in response to a desired state indicated by the terminal assistance information message being an RRC idle state, the first terminal capability information is terminal capability information of the terminal in the RRC idle state.

Alternatively, in response to a desired state indicated by the terminal assistance information message being an RRC inactive state, the first terminal capability information is terminal capability information of the terminal in the RRC inactive state.

Alternatively, in response to a desired state indicated by the terminal assistance information message being an RRC non-connected state, the first terminal capability information is terminal capability information of the terminal in the RRC non-connected state. The RRC non-connected state includes an RRC idle state and an RRC inactive state.

In some embodiments, if the first terminal capability information is terminal capability information of the terminal in the RRC idle state, the second base station may determine that the terminal in the RRC idle state supports or does not support paging the terminal in the group paging manner according to the first terminal capability information.

In some embodiments, if the first terminal capability information is terminal capability information of the terminal in the RRC inactive state, the second base station may determine that the terminal in the RRC inactive state supports or does not support paging the terminal in the group paging manner according to the first terminal capability information.

In some embodiments, if the first terminal capability information is terminal capability information of the terminal in the RRC non-connected state, the second base station may determine that the terminal in the RRC non-connected state supports or does not support paging the terminal in the group paging manner according to the first terminal capability information.

As illustrated in FIG. 20, a method for reporting terminal capability information is provided in some embodiments. The method is performed by the core network device. The method includes the following step.

At step 201, first terminal capability information for group paging from a first base station is received. The first terminal capability information is at least configured to indicate that a terminal supports or does not support paging the terminal in a group paging manner.

The terminal may be but not limited to a mobile phone, a wearable device, a vehicle-mounted terminal, an RSU, a smart home terminal, an industrial sensing device and/or a medical device.

It should be noted that, the base station involved in the disclosure may be an access device where the terminal accesses the network. These may be various types of base stations such as a 3G network base station, a 4G network base station, a 5G network base station, or other evolutionary base station.

In some embodiments, the group paging may be that the network pages all terminals in one group by sending one group paging message, without sending the paging message separately for each terminal. After receiving the group paging message, the terminal determines whether it belongs to a paged group, and if yes, the group paging message is responded, and if not, the group paging message is ignored.

In some embodiments, there may be a plurality of groups for the group paging. Different groups may be configured with different paging resources. The terminal may belong to a certain group in the plurality of groups. Which group the terminal belongs to may be determined by the base station or a certain network element in the core network.

In some embodiments, which group the terminal belongs to may be determined by the base station or the network element in the core network. The first terminal capability information indicates a capability that the terminal supports paging the terminal in the group paging manner.

In some embodiments, only when the terminal has the capability that supports paging the terminal in the group paging manner, the network side may page the terminal in the group paging manner. When the terminal does not have the capability that supports paging the terminal in the group paging manner, the network side may not page the terminal in the group paging manner. When the network side may not page the terminal in the group paging manner, the network side may not allocate grouping information to the terminal. The grouping information is configured to indicate the group to which the terminal belongs.

In some embodiments, the network side may determine the group to which the terminal belongs according to a probability of the terminal being paged. The network side may refer to the base station or the core network device. In some embodiments, in response to the probability of the terminal being paged being less than a probability threshold, it is determined that the terminal belongs to a first group: or in response to the probability of the terminal being paged being greater than the probability threshold, it is determined that the terminal belongs to a second group. Paging resources configured for the first group and the second group are different. It should be noted that, the first terminal capability information may indicate a capability that the terminal supports grouping according to the statistical probability value of the terminal being paged.

In some embodiments, the network side may determine the group to which the terminal belongs according to a probability level of the probability of the terminal being paged. In some embodiments, the probability level of the probability of the terminal being paged may be divided into a low level, a medium level, and a high level. In some embodiments, in response to the probability level of the probability of the terminal being paged being the low level, it is determined that the group to which the terminal belongs is a first group: or in response to the probability level of the probability of the terminal being paged is the medium level, it is determined that the group to which the terminal belongs is a second group: or in response to the probability level of the probability of the terminal being paged is the high level, it is determined that the group to which the terminal belongs is a third group. Paging resources configured for the first group, the second group, and the third group are different. It should be noted that, the first terminal capability information may indicate a capability that the terminal supports grouping according to the probability level of the statistical probability value of the terminal being paged. Different probability levels correspond to different probability ranges. For example, the low level corresponds to probabilities a to b, the medium level corresponds to probabilities c to d, and the high level corresponds to probabilities e to f. a is less than b, b is less than c, c is less than d, d is less than e, and e is less than f.

It should be noted that, the group may be a group to which the terminal belongs, which is configured according to a preset rule when the terminal is paged in the group paging manner. There may be a plurality of groups.

In some embodiments, the first terminal capability information for the group paging is reported in response to the terminal establishing an RRC connection with the first base station. The first base station receives the first terminal capability information for the group paging. The first terminal capability information may indicate that the terminal supports paging the terminal in the group paging manner. Alternatively, the first terminal capability information may indicate that the terminal does not support paging the terminal in the group paging manner.

In some embodiments, the first terminal capability information of the terminal in different RRC non-connected states may be different. The RRC non-connected states include an RRC idle state and/or an RRC inactive state. In some embodiments, the first terminal capability information may indicate that when the terminal is in an RRC idle state, the terminal supports paging the terminal in the group paging manner. Alternatively, the first terminal capability information may indicate that when the terminal is in an RRC idle state, the terminal does not support paging the terminal in the group paging manner. Alternatively, the first terminal capability information may indicate that when the terminal is in an RRC inactive state, the terminal supports paging the terminal in the group paging manner. Alternatively, the first terminal capability information may indicate that when the terminal is in an RRC inactive state, the terminal does not support paging the terminal in the group paging manner.

In some embodiments, the first terminal capability information of the terminal in the RRC idle state is the same as the first terminal capability information of the terminal in the RRC inactive state.

In some embodiments, a terminal capability report message for indicating the first terminal capability information may be reported. In other embodiments, a terminal assistance information message for indicating the first terminal capability information may be reported.

It should be noted that, when the terminal assistance information message for indicating the first terminal capability information is reported, in response to a desired state indicated by the terminal assistance information message being an RRC idle state, the first terminal capability information is terminal capability information of the terminal in the RRC idle state. Alternatively, in response to a desired state indicated by the terminal assistance information message being an RRC inactive state, the first terminal capability information is terminal capability information of the terminal in the RRC inactive state. Alternatively, in response to a desired state indicated by the terminal assistance information message being an RRC non-connected state, the first terminal capability information is terminal capability information of the terminal in the RRC inactive state. The RRC non-connected state includes an RRC idle state and an RRC inactive state.

In some embodiments, the terminal in the RRC connected state may receive second terminal capability information for the group paging from the first base station. The second terminal capability information is at least configured to indicate that the first base station supports or does not support paging the terminal in the group paging manner. In some embodiments, when the terminal determines that the terminal does not support paging the terminal in the group paging manner after receiving the second terminal capability information, the terminal may receive a paging message according to a preset group. In other embodiments, when it is determined that the first base station does not support paging the terminal in the group paging manner according to the second terminal capability information, a paging message is received according to a preset group. The preset group may be preconfigured. The first base station may send the paging message to the terminal by using resources in the group. In some embodiments, the paging message sent according to the preset group may be carried by a power-saving signal. In some embodiments, the paging message may be carried by other power-saving signal than the power-saving signal corresponding to the paging group. For example, the paging message may be carried by a common power-saving signal.

In some embodiments, when it is determined that the terminal does not support paging the terminal in the group paging manner, the terminal may receive the paging message according to a no-grouping solution. In other embodiments, when it is determined that the second base station does not support paging the terminal in the group paging manner according to third terminal capability information from the second base station, the terminal may receive the paging message according to a no-grouping solution. In some embodiments, if a paging advance indication is used, the paging advance indication may be carried by a common power-saving signal. In this case, the common power-saving signal does not carry grouping information.

It should be noted that, those skilled in the art may understand that, the method provided in embodiments of the disclosure may be executed independently or may be executed in combination with some methods in embodiments of the disclosure or some methods in the related art.

Figure 21:
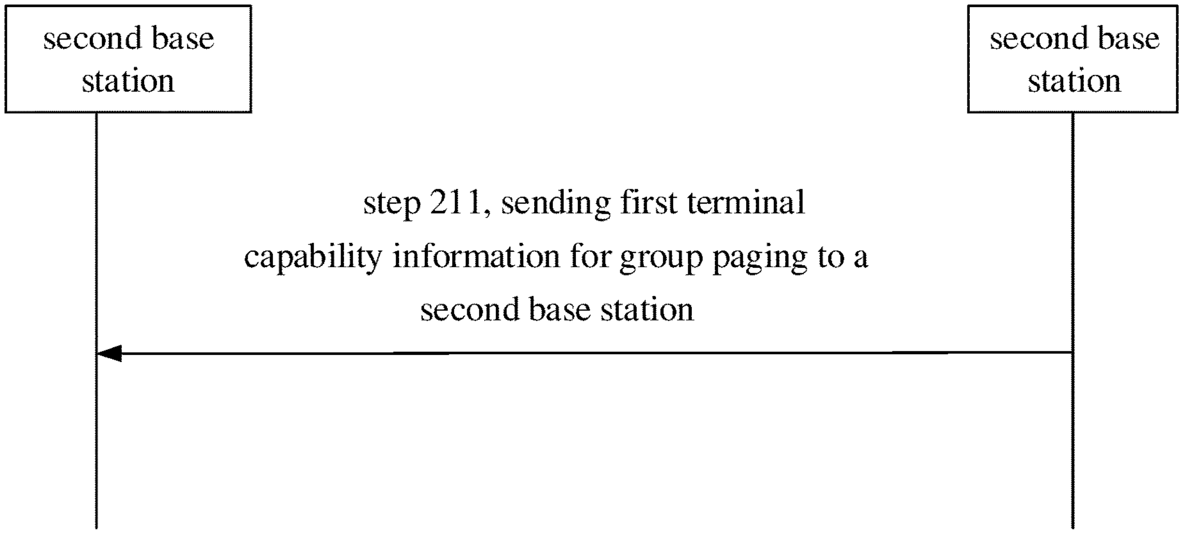
FIG. 21 is a flowchart illustrating a method for reporting terminal capability information according to some embodiments.

As illustrated in FIG. 21, a method for reporting terminal capability information is provided in some embodiments. The method is performed by the core network device. The method includes the following step.

At step 211, first terminal capability information for group paging is sent to a first base station.

In some embodiments, a paging message for indicating the first terminal capability information is sent to the first base station.

In some embodiments, when the core network device sends the paging message for indicating the first terminal capability information to the first base station, if the terminal capability information is carried in the paging message, it indicates that the terminal supports paging the terminal in the group paging manner. If the terminal capability information is not carried in the paging message, it indicates that the terminal does not support paging the terminal in the group paging manner. In some embodiments, if the first terminal capability information is carried in the paging message, it indicates that the terminal supports paging the terminal in the group paging manner. If the first terminal capability information is not carried in the paging message, it indicates that the terminal does not support paging the terminal in the group paging manner.

In some embodiments, the paging message may explicitly indicate the first terminal capability information. In some embodiments, the paging message may carry an identifier for indicating the first terminal capability information. For example, when the identifier is a first identifier, the first terminal capability information indicates that the terminal supports paging the terminal in the group paging manner: and when the identifier is a second identifier, the first terminal capability information indicates that the terminal does not support paging the terminal in the group paging manner.

In some embodiments, the paging message may implicitly indicate the first terminal capability information. In some embodiments, when grouping information and probability information for paging is carried in the paging message, the first terminal capability information indicates that the terminal supports paging the terminal in the group paging manner: and when grouping information and probability information for paging is not carried in the paging message, the first terminal capability information indicates that the terminal does not support paging the terminal in the group paging manner In some embodiments, the first terminal capability information may be sent by one of: an initial context setup request message (INITIAL CONTEXT SETUP REQUEST), a terminal context modification request message (UE CONTEXT MODIFICATION REQUEST), a handover request message (HANDOVER REQUEST), or a path switch request acknowledge message (PATH SWITCH REQUEST ACKNOWLEDGE).

It should be noted that, those skilled in the art may understand that, the method provided in embodiments of the disclosure may be executed independently or may be executed in combination with some methods in embodiments of the disclosure or some methods in the related art.

Figure 22:
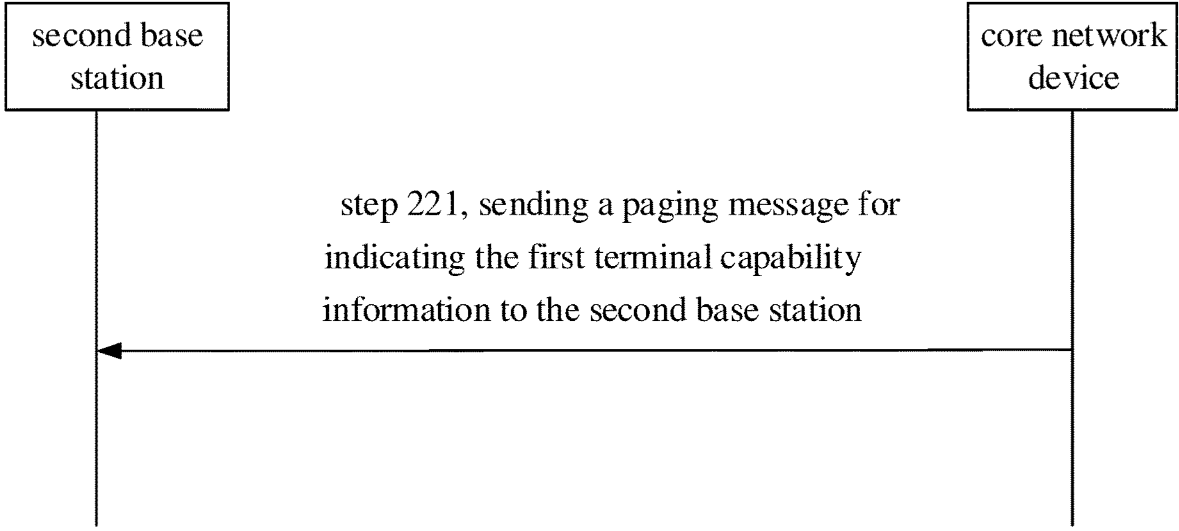
FIG. 22 is a flowchart illustrating a method for reporting terminal capability information according to some embodiments.

As illustrated in FIG. 22, a method for reporting terminal capability information is provided in some embodiments. The method is performed by the core network device. The method includes the following step.

At step 221, a paging message for indicating the first terminal capability information is sent to the second base station.

In some embodiments, when the core network device sends a paging message for indicating the first terminal capability information to the second base station, if the terminal capability information is carried in the paging message, it indicates that the terminal supports paging the terminal in the group paging manner. If the terminal capability information is not carried in the paging message, it indicates that the terminal does not support paging the terminal in the group paging manner. In some embodiments, if the first terminal capability information is carried in the paging message, it indicates that the terminal supports paging the terminal in the group paging manner. If the first terminal capability information is not carried in the paging message, it indicates that the terminal does not support paging the terminal in the group paging manner.

In some embodiments, the paging message may explicitly indicate the first terminal capability information. In some embodiments, the paging message may carry an identifier for indicating the first terminal capability information. For example, when the identifier is a first identifier, the first terminal capability information indicates that the terminal supports paging the terminal in the group paging manner: and when the identifier is a second identifier, the first terminal capability information indicates that the terminal does not support paging the terminal in the group paging manner.

In some embodiments, the paging message may implicitly indicate the first terminal capability information. In some embodiments, when grouping information and probability information for paging is carried in the paging message, the first terminal capability information indicates that the terminal supports paging the terminal in the group paging manner: and when grouping information and probability information for paging is not carried in the paging message, the first terminal capability information indicates that the terminal does not support paging the terminal in the group paging manner In some embodiments, the first terminal capability information may be sent by one of: an initial context setup request message (INITIAL CONTEXT SETUP REQUEST), a terminal context modification request message (UE CONTEXT MODIFICATION REQUEST), a handover request message (HANDOVER REQUEST), or a path switch request acknowledge message (PATH SWITCH REQUEST ACKNOWLEDGE).

It should be noted that, those skilled in the art may understand that, the method provided in embodiments of the disclosure may be executed independently or may be executed in combination with some methods in embodiments of the disclosure or some methods in the related art.

Figures 23, 24:
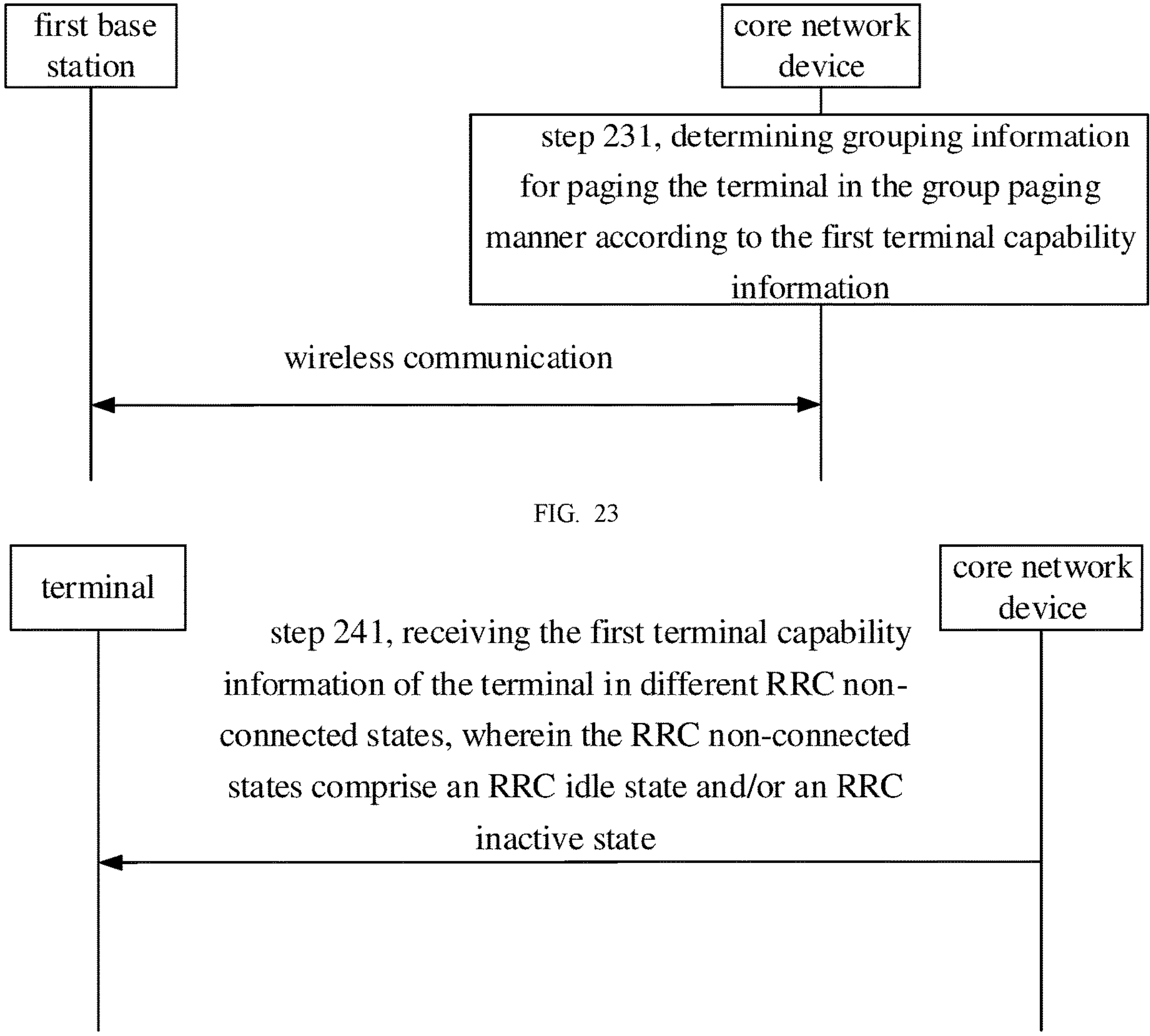
FIG. 23 is a flowchart illustrating a method for reporting terminal capability information according to some embodiments.
FIG. 24 is a flowchart illustrating a method for reporting terminal capability information according to some embodiments.

As illustrated in FIG. 23, a method for reporting terminal capability information is provided in some embodiments. The method is performed by the core network device. The method includes the following step.

At step 231, grouping information for paging the terminal in the group paging manner is determined according to the first terminal capability information.

In some embodiments, the core network device may determine a plurality of groups and each of the plurality of groups has corresponding group identifier information. The group identifier information corresponding to the group determined may be carried in the first terminal capability information. In this way, the core network device may determine the grouping information for paging the terminal in the group paging manner.

In some embodiments, the first terminal capability information includes at least one of:

first information for indicating a capability that the terminal supports or does not support paging the terminal in the group paging manner:

second information for indicating a capability that the terminal supports or does not support grouping according to a statistical probability value of the terminal being paged: or third information for indicating a capability that the terminal supports or does not support grouping according to a probability level of a statistical probability value of the terminal being paged.

In some embodiments, a value of an information field indicates the capability that the terminal supports or does not support paging the terminal in the group paging manner. For example, in response to the value of the information field of the first information being the first value, it indicates the capability that the terminal supports paging the terminal in the group paging manner. Alternatively, in response to the value of the information field of the first information being the second value, it indicates the capability that the terminal does not support paging the terminal in the group paging manner.

In some embodiments, the terminal may perform the statistics to acquire the probability value of the terminal being paged. If the terminal supports the capability of grouping according to the statistical probability value of the terminal being paged, the network side may perform a paging grouping according to the probability value of the terminal being paged which is acquired by the statistics of the terminal.

In some embodiments, in response to the probability of the terminal being paged being less than a probability threshold, it is determined that the terminal belongs to a first group: or in response to the probability of the terminal being paged being greater than the probability threshold, it is determined that the terminal belongs to a second group. Paging resources configured for the first group and the second group are different. It should be noted that, the first terminal capability information may indicate the capability that the terminal supports grouping according to the statistical probability value of the terminal being paged.

In some embodiments, the first terminal capability information may indicate the probability of the terminal being paged. The probability of the terminal being paged may be a probability of the terminal being paged within a predetermined period of time.

In some embodiments, the terminal may perform the statistics to acquire the probability value of the terminal being paged, and determine the probability level of the probability value of the terminal being paged according to the probability value. If the terminal supports the capability that the terminal supports grouping according to the probability level of the statistical probability value of the terminal being paged, the network side may perform the paging grouping according to the probability level of the probability value of the terminal being paged which is acquired by the statistics of the terminal.

In some embodiments, the probability level of the probability of the terminal being paged may be divided into a low level, a medium level, and a high level. In some embodiments, in response to the probability level of the probability of the terminal being paged being the low level, it is determined that the group to which the terminal belongs is a first group: or in response to the probability level of the probability of the terminal being paged is the medium level, it is determined that the group to which the terminal belongs is a second group: or in response to the probability level of the probability of the terminal being paged is the high level, it is determined that the group to which the terminal belongs is a third group. Paging resources configured for the first group, the second group, and the third group are different. It should be noted that, the first terminal capability information may indicate a capability that the terminal supports grouping according to the probability level of the statistical probability value of the terminal being paged.

It should be noted that, those skilled in the art may understand that, the method provided in embodiments of the disclosure may be executed independently or may be executed in combination with some methods in embodiments of the disclosure or some methods in the related art.

As illustrated in FIG. 24, a method for reporting terminal capability information is provided in some embodiments. The method is performed by the core network device. The method includes the following step.

At step 241, first terminal capability information of the terminal in different RRC non-connected states is received. The RRC non-connected states include an RRC idle state and and/or an RRC inactive state.

In some embodiments, the first terminal capability information may be determined for different RRC non-connected states.

In some embodiments, the terminal may determine that when the terminal is in the RRC idle state, the terminal supports paging the terminal in the group paging manner. Alternatively, the terminal may determine that when the terminal is in the RRC idle state, the terminal does not support paging the terminal in the group paging manner.

In some embodiments, the terminal may determine that when the terminal is in the RRC inactive state, the terminal supports paging the terminal in the group paging manner. Alternatively, the terminal may determine that when the terminal is in the RRC inactive state, the terminal does not support paging the terminal in the group paging manner.

In this way, the core network device may determine whether the terminal in different RRC non-connected states supports paging the terminal in the group paging manner according to the first terminal capability information.

In some embodiments, the first terminal capability information in the RRC idle state may be the same as the first terminal capability information of the terminal in the RRC inactive state.

It should be noted that, those skilled in the art may understand that, the method provided in embodiments of the disclosure may be executed independently or may be executed in combination with some methods in embodiments of the disclosure or some methods in the related art.

In some embodiments, in response to a desired state indicated by the terminal assistance information message being an RRC idle state, the first terminal capability information is terminal capability information of the terminal in the RRC idle state.

Alternatively, in response to a desired state indicated by the terminal assistance information message being an RRC inactive state, the first terminal capability information is terminal capability information of the terminal in the RRC inactive state.

Alternatively, in response to a desired state indicated by the terminal assistance information message being an RRC non-connected state, the first terminal capability information is terminal capability information of the terminal in the RRC non-connected state. The RRC non-connected state includes an RRC idle state and an RRC inactive state.

In some embodiments, if the first terminal capability information is terminal capability information of the terminal in the RRC idle state, the network may determine that the terminal in the RRC idle state supports or does not support paging the terminal in the group paging manner according to the first terminal capability information.

In some embodiments, if the first terminal capability information is terminal capability information of the terminal in the RRC inactive state, the network may determine that the terminal in the RRC inactive state supports or does not support paging the terminal in the group paging manner according to the first terminal capability information.

In some embodiments, if the first terminal capability information is terminal capability information of the terminal in the RRC non-connected state, the network may determine that the terminal in the RRC non-connected state supports or does not support paging the terminal in the group paging manner according to the first terminal capability information.

Figure 25:
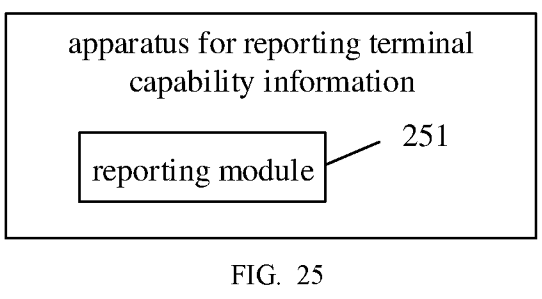
FIG. 25 is a diagram illustrating an apparatus for reporting terminal capability information according to some embodiments.

As illustrated in FIG. 25, an apparatus for reporting terminal capability information is provided in embodiments of the disclosure. The apparatus includes a reporting module 251.

The reporting module 251 is configured to report first terminal capability information for group paging.

The first terminal capability information is at least configured to indicate that a terminal supports or does not support paging the terminal in a group paging manner.

It should be noted that, those skilled in the art may understand that, the method provided in embodiments of the disclosure may be executed independently or may be executed in combination with some methods in embodiments of the disclosure or some methods in the related art.

Figure 26:
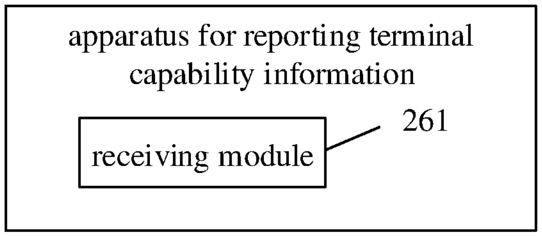
FIG. 26 is a diagram illustrating an apparatus for reporting terminal capability information according to some embodiments.

As illustrated in FIG. 26, an apparatus for reporting terminal capability information is provided in embodiments of the disclosure. The apparatus includes a receiving module 261.

The receiving module 261 is configured to receive first terminal capability information for group paging.

The first terminal capability information is at least configured to indicate that a terminal supports or does not support paging the terminal in a group paging manner.

It should be noted that, those skilled in the art may understand that, the method provided in embodiments of the disclosure may be executed independently or may be executed in combination with some methods in embodiments of the disclosure or some methods in the related art.

Figure 27:
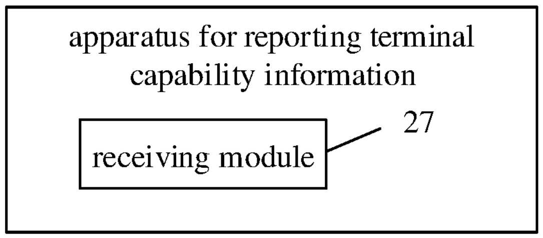
FIG. 27 is a diagram illustrating an apparatus for reporting terminal capability information according to some embodiments.

As illustrated in FIG. 27, an apparatus for reporting terminal capability information is provided in embodiments of the disclosure. The apparatus includes a receiving module 271.

The receiving module 271 is configured to receive first terminal capability information for group paging from a core network device or a first base station.

The first terminal capability information is at least configured to indicate that a terminal supports or does not support paging the terminal in a group paging manner.

It should be noted that, those skilled in the art may understand that, the method provided in embodiments of the disclosure may be executed independently or may be executed in combination with some methods in embodiments of the disclosure or some methods in the related art.

Figure 28:
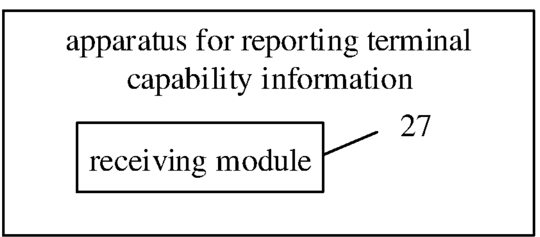
FIG. 28 is a diagram illustrating an apparatus for reporting terminal capability information according to some embodiments.

As illustrated in FIG. 28, an apparatus for reporting terminal capability information is provided in embodiments of the disclosure. The apparatus includes a receiving module 281.

The receiving module 281 is configured to receive first terminal capability information for group paging from a first base station.

The first terminal capability information is at least configured to indicate that a terminal supports or does not support paging the terminal in a group paging manner.

It should be noted that, those skilled in the art may understand that, the method provided in embodiments of the disclosure may be executed independently or may be executed in combination with some methods in embodiments of the disclosure or some methods in the related art.

A communication device is provided in embodiments of the disclosure and includes: a processor: and a memory for storing instructions executable by the processor: in which the processor is configured to perform the method described in the above any embodiment when running the executable instructions.

The processor may include various types of storage media. The storage medium is a non-transitory computer storage medium and may continue memorizing and storing information thereon when a communication device is powered off.

The processor is connected to the memory via a bus and may be configured to read an executable program stored on the memory.

A computer storage medium stored with a computer executable program is further provided in embodiments of the disclosure. The executable program realizes the method as described in the above any embodiment when executed by a processor.

With respect to the apparatuses or devices in the above embodiments, the specific manners for performing operations for individual modules therein have been described in detail in the embodiments regarding the methods, which will not be elaborated herein.

Figure 29:
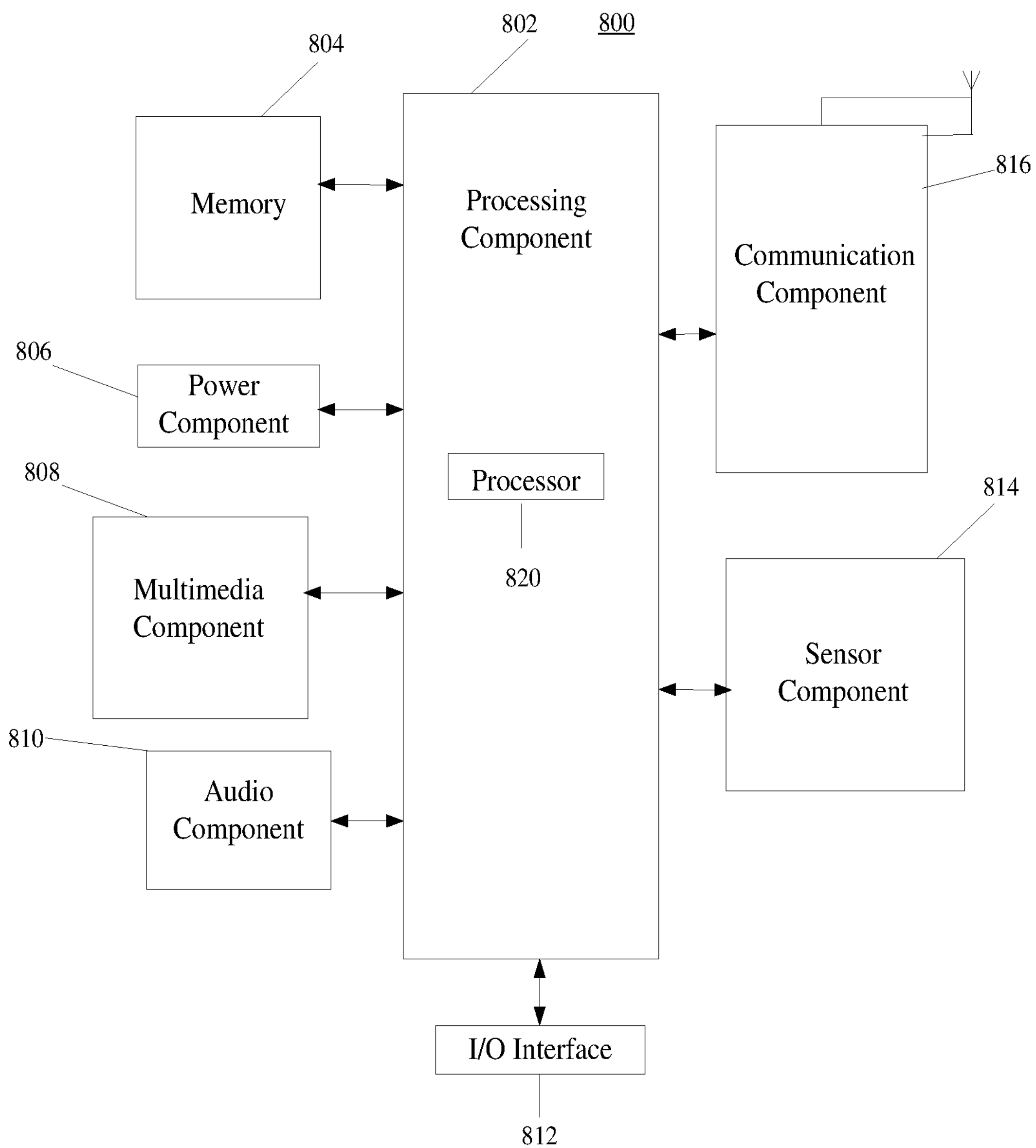
FIG. 29 is a diagram illustrating a terminal according to some embodiments.

As illustrated in FIG. 29, a structure of a terminal is provided according to some embodiments of the disclosure.

As illustrated in FIG. 29, a terminal 800 is provided in some embodiments. The terminal may be a mobile phone, a computer, a digital broadcast terminal, a messaging device, a gaming console, a tablet, a medical device, exercise equipment, a personal digital assistant, and the like.

As illustrated in FIG. 29, the terminal 800 may include one or more components: a processing component 802, a memory 804, a power component 806, a multimedia component 808, an audio component 810, an input/output (I/O) interface 812, a sensor component 814, and a communication component 816.

The processing component 802 typically controls overall operations of the terminal 800, such as the operations associated with display, telephone calls, data communications, camera operations, and recording operations. The processing component 802 may include one or more processors 820 to execute instructions to perform all or part of the steps in the above described methods. In addition, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the terminal 800. Examples of such data include instructions for any applications or methods operated on the terminal 800, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the terminal 800. The power component 806 may include a power management system, one or more power sources, and any other components associated with the generation, management, and distribution of power in the terminal 800.

The multimedia component 808 includes a screen providing an output interface between the terminal 800 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 808 includes a front camera and/or a rear camera. The front camera and the rear camera may receive an external multimedia datum while the terminal 800 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the terminal 800 is in an operation mode, such as a call mode, a recording mode, and a voice recognition mode. The received audio signal may be further stored in the memory 804 or transmitted via the communication component 816. In some embodiments, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the terminal 800. For instance, the sensor component 814 may detect an open/closed status of the terminal 800, relative positioning of components, e.g., the display and the keypad, of the terminal 800, a change in position of the terminal 800 or a component of the terminal 800, a presence or absence of user contact with the terminal 800, an orientation or an acceleration/deceleration of the terminal 800, and a change in temperature of the terminal 800. The sensor component 814 may include a proximity sensor configured to detect the presence of nearby objects without any physical contact. The sensor component 814 may also include a light sensor, such as a CMOS or CCD image sensor, for use in imaging applications. In some embodiments, the sensor component 814 may also include an accelerometer sensor, a gyroscope sensor, a magnetic sensor, a pressure sensor, or a temperature sensor.

The communication component 816 is configured to facilitate communication, wired or wirelessly, between the terminal 800 and other devices. The terminal 800 can access a wireless network based on a communication standard, such as Wi-Fi, 2G, or 3G, or a combination thereof. In some embodiments, the communication component 816 receives a broadcast signal or broadcast associated information from an external broadcast management system via a broadcast channel. In some embodiments, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In some embodiments, the terminal 800 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as included in the memory 804, executable by the processor 820 in the terminal 800, for performing the above-described methods. For example, the non-transitory computer-readable storage medium may be a ROM, a RAM, a CD-ROM, a magnetic tape, a floppy disc, an optical data storage device, and the like.

Figure 30:
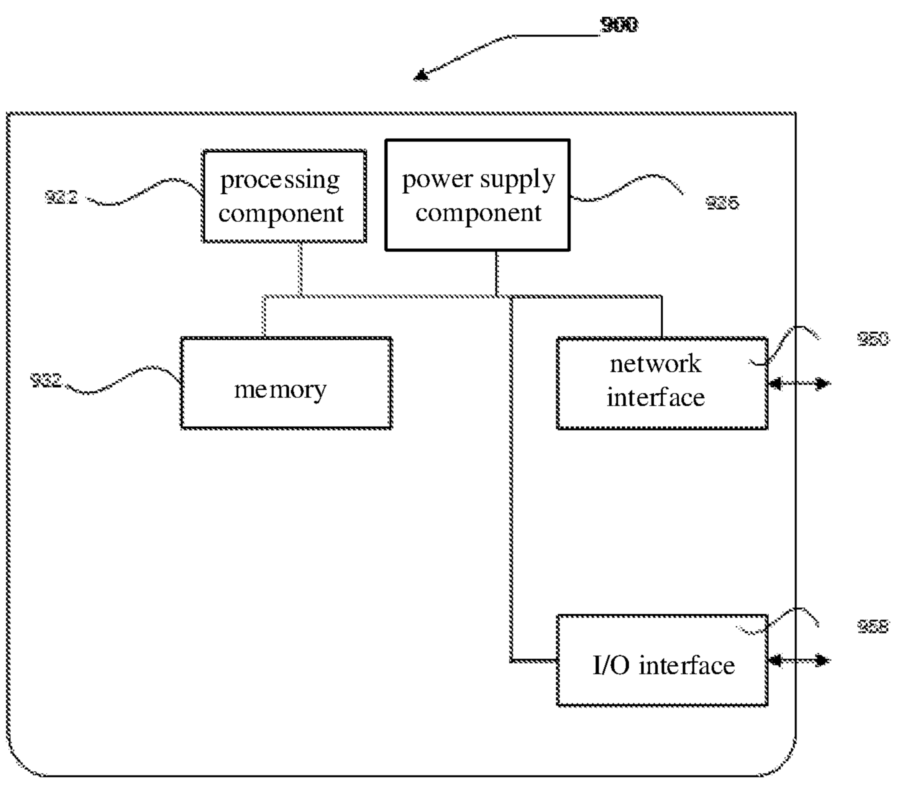
FIG. 30 is a block diagram illustrating a base station according to some embodiments.

FIG. 30 is a block diagram illustrating a base station according to some embodiments of the disclosure. For example, a base station 900 may be provided as a network side device. As illustrated in FIG. 30, the base station 900 includes a processing component 922, which further includes one or more processors, and memory resources represented by a memory 932, which are configured to store instructions executable by the processing component 922, for example, an application. The application stored in the memory 932 may include one or more modules each of which corresponds to a set of instructions. In addition, the processing component 922 is configured to execute instructions, to perform any one method applied to the base station as described in the above method.

The base station 900 may further include a power supply component 926 configured to execute power management of the base station 900, a wired or wireless network interface 950 configured to connect the base station 900 to a network, and an I/O interface 958. The base station 900 may operate an operating system stored in the memory 932, for example, Windows Server™, Mac OS X™, Unix™, Linux™, FreeBSD™, or the like.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the disclosure as come within known or customary practice in the art. It is intended that the specification and examples be considered as exemplary only, with a true scope and spirit of the disclosure being indicated by the following claims.

It will be appreciated that the disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for reporting terminal capability information, performed by a terminal, the method comprising:

sending, to a first base station, first terminal capability information for group paging;

wherein the first terminal capability information indicates that the terminal supports paging the terminal by the group paging; and the first terminal capability information comprises:

second information configured for indicating a capability that the terminal supports grouping according to a statistical probability value of the terminal being paged, and configured for a core network device to determine a group to which the terminal belongs according to the statistical probability value; and third information configured for indicating a capability that the terminal supports grouping according to a probability level of a statistical probability value of the terminal being paged, and configured for the core network device to determine the group to which the terminal belongs according to the probability level.

2. The method according to claim 1, wherein the first terminal capability information indicates a network to determine grouping information for paging the terminal by the group paging.

3. The method according to claim 2, wherein the first terminal capability information further comprises:

first information for indicating a capability whether or not the terminal supports paging the terminal by the group paging.

4. The method according to claim 1, further comprising:

sending the first terminal capability information of the terminal in different radio resource control (RRC) non-connected states, wherein the RRC non-connected states comprise at least one of an RRC idle state or an RRC inactive state.

5. The method according to claim 4, wherein the first terminal capability information of the terminal in the RRC idle state is the same as the first terminal capability information of the terminal in the RRC inactive state.

6. The method according to claim 1, further comprising:

sending, to the first base station, a terminal capability report message for indicating the first terminal capability information.

7. The method according to claim 6, further comprising at least one of:

determining a desired state indicated by the terminal assistance information message being a radio resource control (RRC) idle state, the first terminal capability information being terminal capability information of the terminal in the RRC idle state;

determining a desired state indicated by the terminal assistance information message being an RRC inactive state, the first terminal capability information being terminal capability information of the terminal in the RRC inactive state; or determining a desired state indicated by the terminal assistance information message being an RRC non-connected state, the first terminal capability information being terminal capability information of the terminal in the RRC non-connected state, wherein the RRC non-connected state comprises an RRC idle state and an RRC inactive state.

8. The method according to claim 1, further comprising:

receiving second terminal capability information for the group paging sent by the first base station;

wherein the second terminal capability information indicates whether or not the first base station supports paging the terminal by the group paging.

9. The method according to claim 8, further comprising:

determining that the terminal does not support paging the terminal by the group paging, or determining that the first base station does not support paging the terminal by the group paging according to the second terminal capability information; and determining to receive a paging message according to preset grouping.

10. A method for reporting terminal capability information, performed by a first base station, the method comprising:

receiving, from a terminal, first terminal capability information for group paging;

wherein the first terminal capability information indicates that the terminal supports paging the terminal by the group paging; and the first terminal capability information comprises:

second information configured for indicating a capability that the terminal supports grouping according to a statistical probability value of the terminal being paged, and configured for a core network device to determine a group to which the terminal belongs according to the statistical probability value; and third information configured for indicating a capability that the terminal supports grouping according to a probability level of a statistical probability value of the terminal being paged, and configured for the core network device to determine the group to which the terminal belongs according to the probability level.

11. The method according to claim 10, further comprising:

receiving, from the terminal, a terminal capability report message for indicating the first terminal capability information.

12. The method according to claim 10, further comprising:

sending the first terminal capability information to the core network device.

13. The method according to claim 10, further comprising:

determining that the terminal re-selects or switches from the first base station to a second base station; and sending the first terminal capability information to the second base station.

14. The method according to claim 13, further comprising:

sending a paging message to the second base station, the paging message indicating the first terminal capability information.

15. A terminal, comprising:

a processor; and a memory storing computer-executable instructions;

wherein the processor is configured to:

send, to a first base station, first terminal capability information for group paging;

wherein the first terminal capability information indicates that the terminal supports paging the terminal by the group paging; and the first terminal capability information comprises:

second information configured for indicating a capability that the terminal supports grouping according to a statistical probability value of the terminal being paged, and configured for a core network device to determine a group to which the terminal belongs according to the statistical probability value; and third information configured for indicating a capability that the terminal supports grouping according to a probability level of a statistical probability value of the terminal being paged, and configured for the core network device to determine the group to which the terminal belongs according to the probability level.

16. A non-transitory computer-readable storage medium having stored therein computer-executable instructions that, when executed by a processor of a terminal, cause the terminal to perform the method of claim 1.

17. The terminal according to claim 15, wherein the processor is further configured to:

send, to the first base station, a terminal capability report message for indicating the first terminal capability information.

18. The terminal according to claim 15, wherein the processor is further configured to:

receive second terminal capability information for the group paging sent by the first base station;

wherein the second terminal capability information indicates whether or not the first base station supports paging the terminal by the group paging.

19. A base station, comprising:

a processor; and a memory storing computer-executable instructions;

wherein the processor is configured to perform the method of claim 10.

20. A non-transitory computer storage medium having stored therein instructions that, when executed by a processor of a base station, cause the base station to perform the method of claim 10.

* * * * *